(12) United States Patent
Bae et al.

(10) Patent No.: US 12,021,633 B2
(45) Date of Patent: *Jun. 25, 2024

(54) METHOD, USER EQUIPMENT, PROCESSING DEVICE, STORAGE MEDIUM, AND COMPUTER PROGRAM FOR RECEIVING DOWNLINK CHANNEL, AND METHOD AND BASE STATION FOR TRANSMITTING DOWNLINK CHANNEL

(71) Applicant: LG Electronics Inc., Seoul (KR)

(72) Inventors: Duckhyun Bae, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,942

(22) Filed: Sep. 6, 2023

(65) Prior Publication Data

US 2023/0421302 A1    Dec. 28, 2023

Related U.S. Application Data

(63) Continuation of application No. 18/170,347, filed on Feb. 16, 2023, now Pat. No. 11,791,946, which is a continuation of application No. PCT/KR2021/014896, filed on Oct. 22, 2021.

(60) Provisional application No. 63/104,456, filed on Oct. 22, 2020.

(30) Foreign Application Priority Data

Oct. 1, 2021   (KR) .................. 10-2021-0131126

(51) Int. Cl.
| H04L 1/18 | (2023.01) |
| H04L 1/1812 | (2023.01) |
| H04W 72/0446 | (2023.01) |
| H04W 72/11 | (2023.01) |

(52) U.S. Cl.
CPC ....... *H04L 1/1812* (2013.01); *H04W 72/0446* (2013.01); *H04W 72/11* (2023.01)

(58) Field of Classification Search
CPC .. H04L 1/1812; H04W 72/11; H04W 72/0446
See application file for complete search history.

(56) References Cited

U.S. PATENT DOCUMENTS

| 11,729,782 B2* | 8/2023 | Zhang | H04L 5/0051 370/336 |
| 11,743,887 B2* | 8/2023 | Kundu | H04W 16/14 370/329 |
| 11,764,908 B2* | 9/2023 | Kim | H04L 1/1861 370/329 |
| 11,792,874 B2* | 10/2023 | Tsai | H04W 76/27 370/329 |

(Continued)

*Primary Examiner* — Brian D Nguyen
(74) *Attorney, Agent, or Firm* — Fish & Richardson P.C.

(57) ABSTRACT

UE can: determine to delay transmission of first HARQ-ACK information of a first SPS PDSCH to a second resource later than a first resource scheduled for the transmission of the first HARQ-ACK information; and drop the delayed transmission of the first HARQ-ACK information and receive a second SPS PDSCH, on the basis that the end of a PUCCH for the delayed transmission of the first HARQ-ACK information is temporally later than the start of the second SPS PDSCH using a HARQ process which is same as the first SPS PDSCH.

15 Claims, 13 Drawing Sheets

(56) References Cited

U.S. PATENT DOCUMENTS

2023/0300940 A1\* 9/2023 Jang .......................... H04L 5/00
 370/329
2023/0309113 A1\* 9/2023 Lin ....................... H04L 1/1812
 370/329

\* cited by examiner

METHOD, USER EQUIPMENT, PROCESSING DEVICE, STORAGE MEDIUM, AND COMPUTER PROGRAM FOR RECEIVING DOWNLINK CHANNEL, AND METHOD AND BASE STATION FOR TRANSMITTING DOWNLINK CHANNEL

CROSS-REFERENCE TO RELATED APPLICATIONS

This application is a continuation of U.S. application Ser. No. 18/170,347, filed on Feb. 16, 2023, now U.S. Pat. No. 11,791,946, which is a continuation of International Application No. PCT/KR2021/014896, with an international filing date of Oct. 22, 2021, which claims the benefit of U.S. Provisional Application No. 63/104,456, filed on Oct. 22, 2020, and Korean Patent Application No. 10-2021-0131126, filed on Oct. 1, 2021, the contents of which are hereby incorporated by reference herein in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

In an aspect of the present disclosure, there is provided a method of receiving a downlink channel by a user equipment (UE) in a wireless communication system. The method may include: receiving a first semi-persistent scheduling (SPS) physical downlink shared channel (PDSCH); determining to delay transmission of first hybrid automatic repeat request-acknowledgement (HARQ-ACK) information for the first SPS PDSCH to a second resource later than a first resource on which the transmission of the first HARQ-ACK information is scheduled to be performed; and based on an end of a physical uplink control channel (PUCCH) for transmission of the delayed first HARQ-ACK information being later in time than a start of a second SPS PDSCH that uses a same HARQ process as the first SPS PDSCH, dropping the transmission of the delayed first HARQ-ACK information.

In another aspect of the present disclosure, there is provided a UE configured to receive a downlink channel in a wireless communication system. The UE may include: at least one transceiver; at least one processor; and at least one computer memory operably connected to the at least one processor and configured to store instructions that, when executed, cause the at least one processor to perform operations. The operations may include: receiving a first SPS PDSCH; determining to delay transmission of first HARQ-ACK information for the first SPS PDSCH to a second resource later than a first resource on which the transmission of the first HARQ-ACK information is scheduled to be performed; and based on an end of a PUCCH for transmission of the delayed first HARQ-ACK information being later in time than a start of a second SPS PDSCH that uses a same HARQ process as the first SPS PDSCH, dropping the transmission of the delayed first HARQ-ACK information.

In another aspect of the present disclosure, there is provided a processing device. The processing device may include: at least one processor; and at least one computer memory operably connected to the at least one processor and configured to store instructions that, when executed, cause the at least one processor to perform operations. The operations may include: receiving a first SPS PDSCH; determining to delay transmission of first HARQ-ACK information for the first SPS PDSCH to a second resource later than a first resource on which the transmission of the first HARQ-ACK information is scheduled to be performed; and based on an end of a PUCCH for transmission of the delayed first HARQ-ACK information being later in time than a start of a second SPS PDSCH that uses a same HARQ process as the first SPS PDSCH, dropping the transmission of the delayed first HARQ-ACK information.

In another aspect of the present disclosure, there is provided a computer-readable storage medium. The computer-readable storage medium may be configured to store at least one computer program including instructions that, when executed by at least one processor, cause the at least one processor to perform operations for a UE. The operations may include: receiving a first SPS PDSCH; determining to delay transmission of first HARQ-ACK information for the first SPS PDSCH to a second resource later than a first resource on which the transmission of the first HARQ-ACK information is scheduled to be performed; and based on an end of a PUCCH for transmission of the delayed first HARQ-ACK information being later in time than a start of a second SPS PDSCH that uses a same HARQ process as the first SPS PDSCH, dropping the transmission of the delayed first HARQ-ACK information.

In another aspect of the present disclosure, there is provided a computer program stored in a computer-readable storage medium. The computer program may include at least one program code including instructions that, when executed, cause at least one processor to perform operations. The operations may include: receiving a first SPS PDSCH; determining to delay transmission of first HARQ-ACK information for the first SPS PDSCH to a second resource later than a first resource on which the transmission of the first HARQ-ACK information is scheduled to be performed; and based on an end of a PUCCH for transmission of the delayed first HARQ-ACK information being later in time than a start of a second SPS PDSCH that uses a same HARQ process as the first SPS PDSCH, dropping the transmission of the delayed first HARQ-ACK information.

In each aspect of the present disclosure, the operations may include receiving the second SPS PDSCH.

In each aspect of the present disclosure, the operations may include: determining to delay transmission of third HARQ-ACK information for a third SPS PDSCH to the second resource later than a third resource on which the transmission of the third HARQ-ACK information is scheduled to be performed; and generating HARQ-ACK uplink control information (UCI) that comprises the first HARQ-ACK information and the third HARQ-ACK information. The first HARQ-ACK information and the third HARQ-ACK information may be included in the HARQ-ACK UCI in chronological order of the first resource and the third resource.

In each aspect of the present disclosure, generating the HARQ-ACK UCI may include appending the first HARQ-ACK information and the third HARQ-ACK information to HARQ-ACK information scheduled to be performed on the second resource.

In each aspect of the present disclosure, the first HARQ-ACK information and the third HARQ-ACK information may be included in the HARQ-ACK UCI in chronological order of the first resource and the third resource.

In each aspect of the present disclosure, the first HARQ-ACK information and the third HARQ-ACK information may be included in the HARQ-ACK UCI in reverse chronological order of the first resource and the third resource.

In another aspect of the present disclosure, there is provided a method of transmitting, by a base station (BS), a downlink channel to a UE in a wireless communication system. The method may include: determining to delay reception of first HARQ-ACK information for a first SPS PDSCH to a second resource later than a first resource scheduled to perform the reception of the first HARQ-ACK information; and based on that an end of a PUCCH for reception of the delayed first HARQ-ACK information is later in time than a start of a second SPS PDSCH based on a same HARQ process as the first SPS PDSCH, omitting the reception of the delayed first HARQ-ACK information.

In a further aspect of the present disclosure, there is provided a BS configured to transmit a downlink channel to a UE in a wireless communication system. The BS may include: at least one transceiver; at least one processor; and at least one computer memory operably connected to the at least one processor and configured to store instructions that, when executed, cause the at least one processor to perform operations. The operations may include: determining to delay reception of first HARQ-ACK information for a first SPS PDSCH to a second resource later than a first resource scheduled to perform the reception of the first HARQ-ACK information; and based on that an end of a PUCCH for reception of the delayed first HARQ-ACK information is later in time than a start of a second SPS PDSCH based on a same HARQ process as the first SPS PDSCH, omitting the reception of the delayed first HARQ-ACK information.

In each aspect of the present disclosure, the operations may include transmitting the second SPS PDSCH.

In each aspect of the present disclosure, the operations may include: determining to delay reception of third HARQ-ACK information for a third SPS PDSCH to the second resource later than a third resource scheduled to perform the reception of the third HARQ-ACK information; and receiving HARQ-ACK UCI including the first HARQ-ACK information and the third HARQ-ACK information. The first HARQ-ACK information and the third HARQ-ACK information may be included in the HARQ-ACK UCI in chronological order of the first resource and the third resource.

In each aspect of the present disclosure, the first HARQ-ACK information and the third HARQ-ACK information may be appended to HARQ-ACK information scheduled to be performed on the second resource so that the first HARQ-ACK information and the third HARQ-ACK information may be included in the HARQ-ACK UCI.

In each aspect of the present disclosure, the first HARQ-ACK information and the third HARQ-ACK information may be included in the HARQ-ACK UCI in chronological order of the first resource and the third resource.

In each aspect of the present disclosure, the first HARQ-ACK information and the third HARQ-ACK information may be included in the HARQ-ACK UCI in reverse chronological order of the first resource and the third resource.

The foregoing solutions are merely a part of the examples of the present disclosure and various examples into which the technical features of the present disclosure are incorporated may be derived and understood by persons skilled in the art from the following detailed description.

According to implementation(s) of the present disclosure, radio communication signals may be efficiently transmitted/received. Accordingly, the overall throughput of a wireless communication system may be improved.

According to implementation(s) of the present disclosure, a wireless communication system may efficiently support various services with different requirements.

According to implementation(s) of the present disclosure, delay/latency occurring in radio communication between communication devices may be reduced.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure.

DETAILED DESCRIPTION

Figure 1:
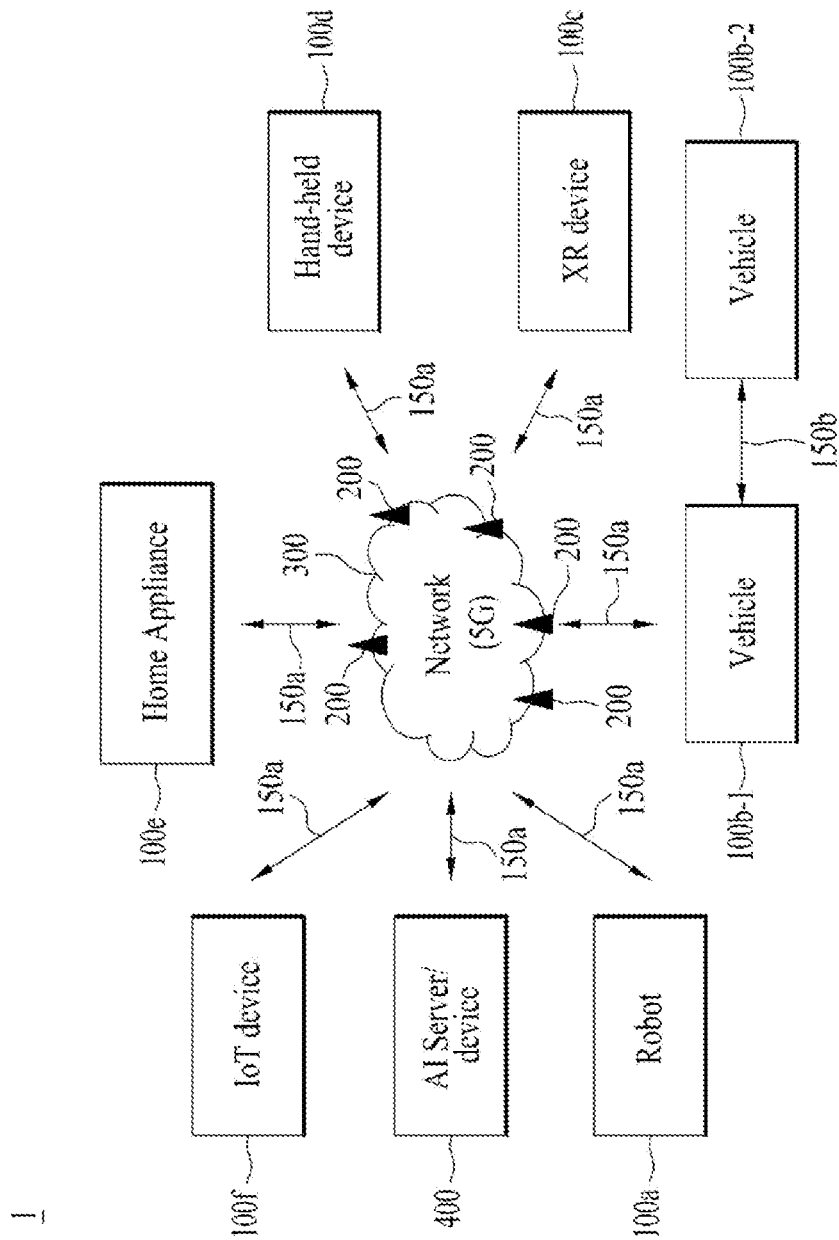
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. The PSCell is a primary Scell of the SCG. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RS s. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., a set of resource elements (REs)) that carry downlink control information (DCI), and the PDSCH refers to a set of time-frequency resources (e.g., a set of REs) that carry DL data. The PUCCH, PUSCH, and PRACH refer to a set of time-frequency resources (i.e., a set of REs) that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCFDL data on or through a PBCH/PDCCH/PDSCH, respectively.

In the present disclosure, a radio resource (e.g., a time-frequency resource) scheduled or configured for the UE by the BS for transmission or reception of PUCCH/PUSCH/PDSCH is also referred to as a PUCCH/PUSCH/PDSCH resource.

Since a communication device receives an SS/PBCH resource block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, not receiving physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to as a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BS s 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
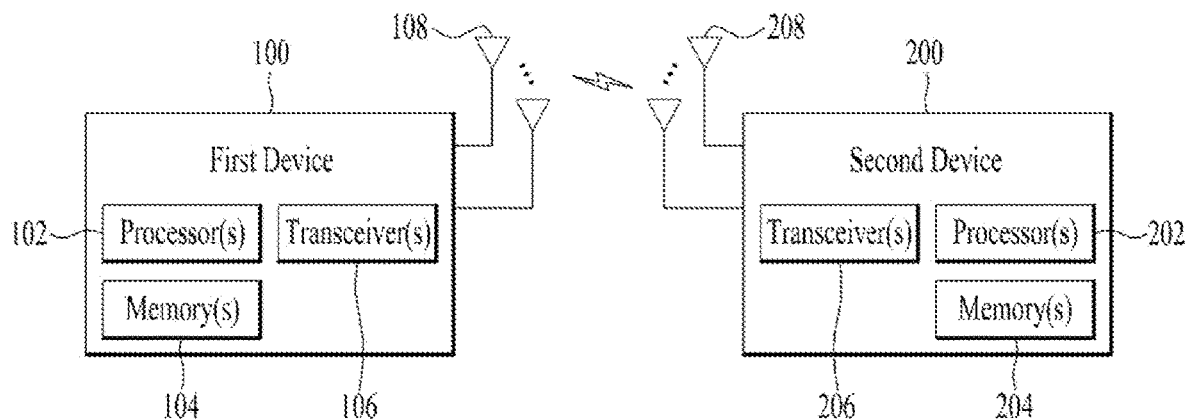
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the afore/below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the afore/below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of Things for low-power communication as well as LTE, NR, and 6G communications. For example, NB-IoT technology may be an example of Low Power Wide Area Network (LPWAN) technology, and may be implemented by, but is limited to, standards such as LTE Cat NB1 and/or LTE Cat NB2. Additionally or alternatively, the wireless communication technology implemented in the wireless devices XXX and YYY of the present disclosure may perform communication based on the LTE-M technology. For example, the LTE-M technology may be an example of the LPWAN technology, and may be called by various names such as enhanced machine type communication (eMTC). For example, the LTE-M technology may be implemented by, but is not limited to, at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M. Additionally or alternatively, the wireless communication technology implemented in the wireless devices XXX and YYY of the present disclosure may include, but is not limited to, at least one of ZigBee, Bluetooth, and Low Power Wide Area Network (LPWAN) considering low-power communication. For example, the ZigBee technology may create personal area networks (PAN) related to small/low-power digital communications based on various standards such as IEEE 802.15.4, and may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP)

layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
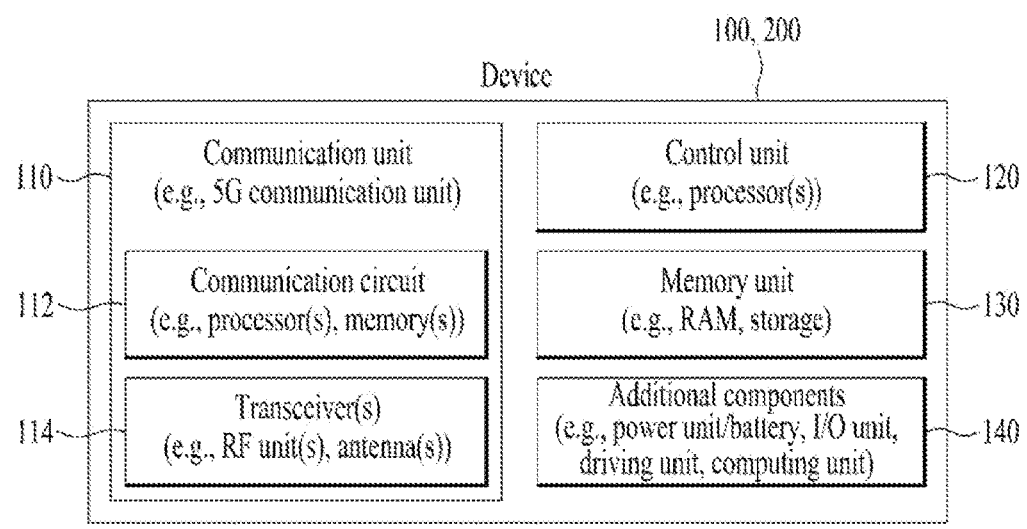
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-volatile) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-volatile) storage medium A communication device of the present disclosure includes at least one processor; and at least one computer memory operably connectable to the at least one processor and configured to store instructions for causing, when executed, the at least one processor to perform operations according to example(s) of the present disclosure described later.

Figure 4:
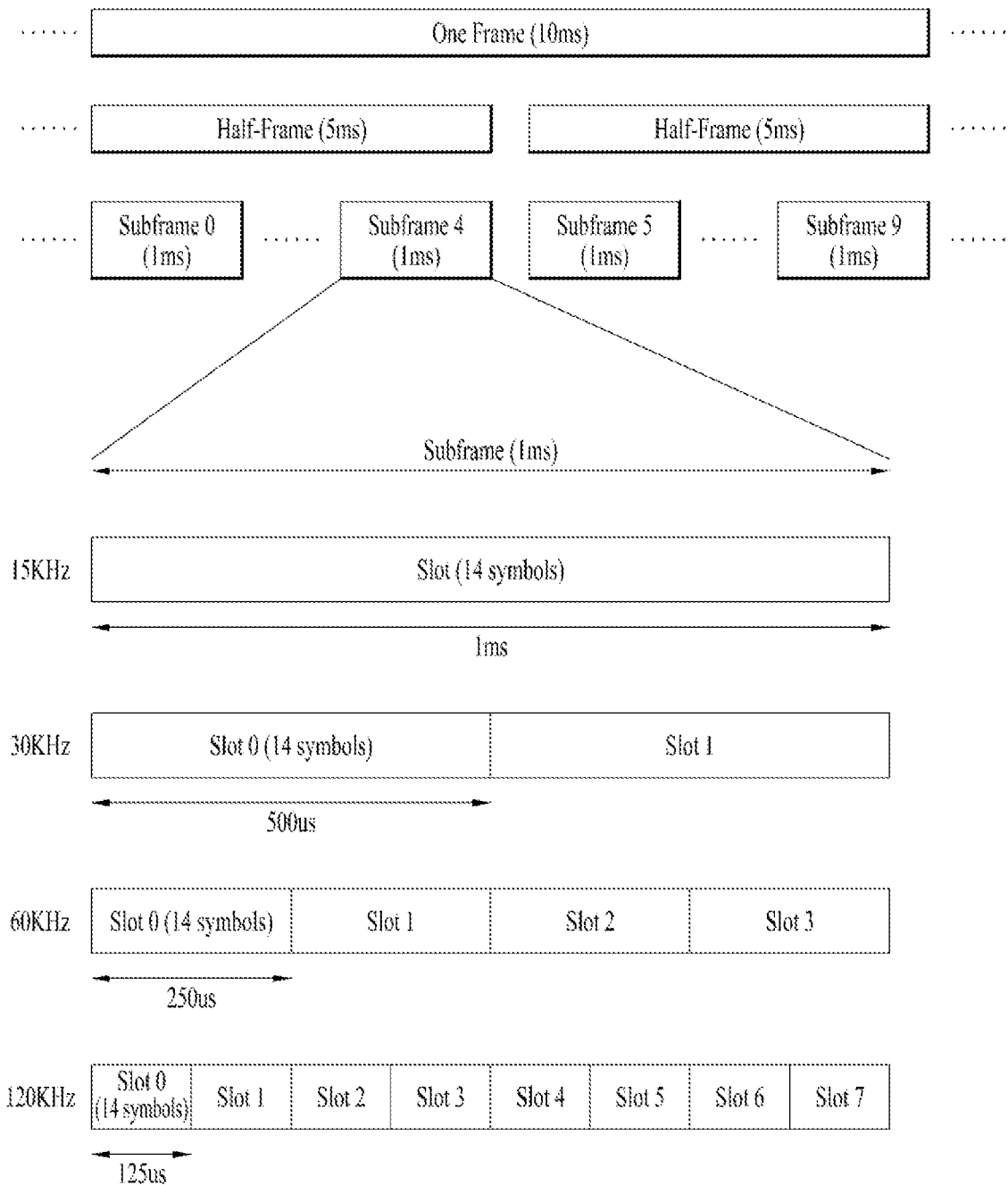
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f=(\Delta f_{max}*N_f/100)*T_c=10$ ms and is divided into two half-frames of 5 ms each. A basic time unit for NR is $T_c=1/(\Delta f_{max}*N_f)$ where $\Delta f_{max}=480*10^3$ Hz and $N_f=4096$. For reference, a basic time unit for LTE is $T_s=1/(\Delta f_{ref}*N_{f,ref})$ where $\Delta f_{ref}=15*10^3$ Hz and $N_{f,ref}=2048$. $T_c$ and $T_f$ have the relationship of a constant $\kappa=T_s/T_c=64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f=2^u*15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

Figure 5:
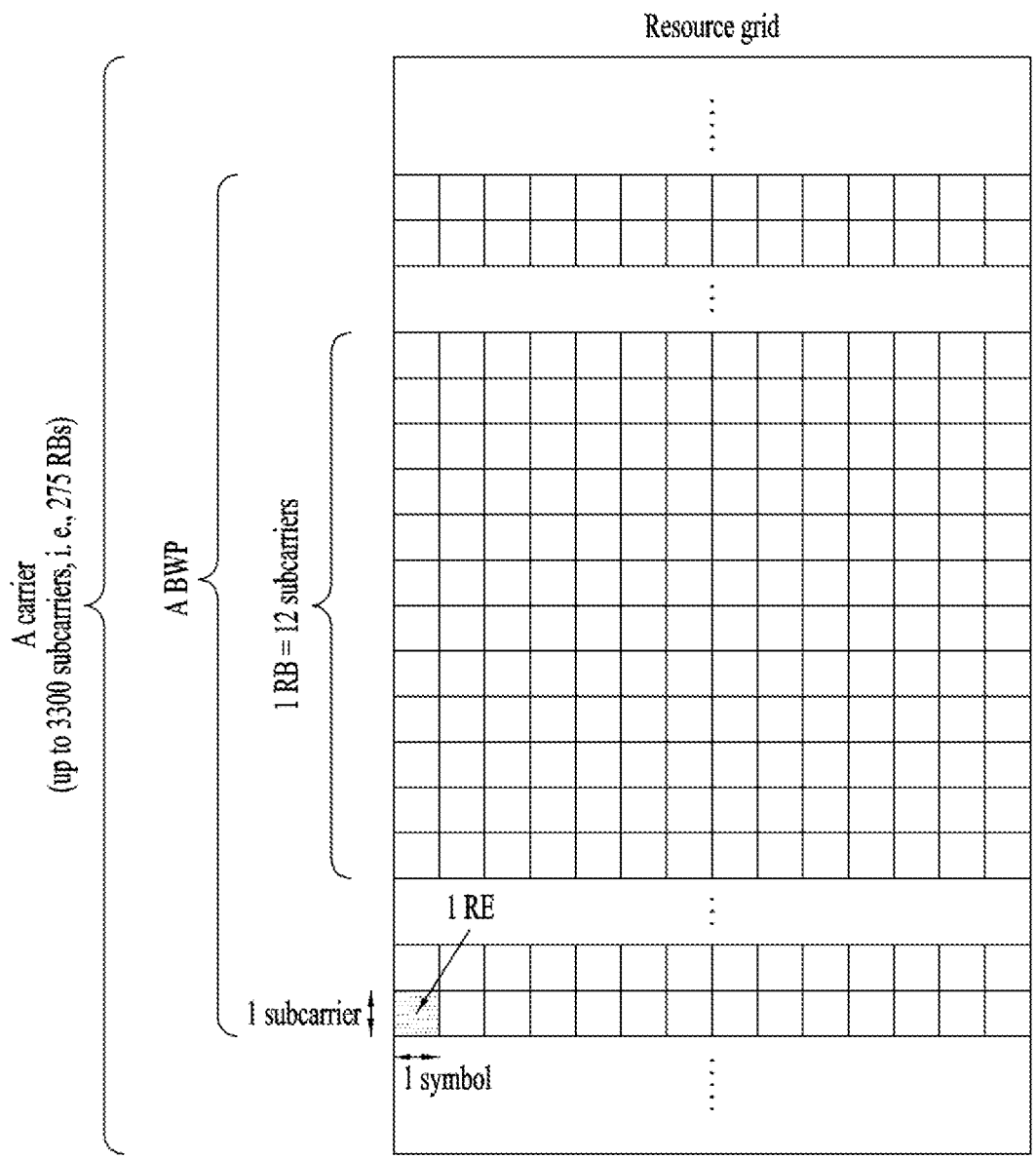
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB}=n^u_{CRB}+N^{size,u}_{BWP,i}$, where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided with the following parameters for the serving cell: i) an SCS; ii) a CP; iii) a CRB $N^{start}_{BWP}=O_{carrier}+RB_{start}$ and the number of contiguous RBs $N^{size}_{BWP}=L_{RB}$ provided by an RRC parameter locationAndBandwidth, which indicates an offset $RB_{set}$ and a length $L_{RB}$ as a resource indicator value (RIV) on the assumption of $N^{start}_{BWP}=275$, and a value $O_{carrier}$ provided by an RRC parameter offsetToCarrier for the SCS; an index in the set of DL BWPs or UL BWPs; a set of BWP-common parameters; and a set of BWP-dedicated parameters.

Virtual resource blocks (VRBs) may be defined within the BWP and indexed from 0 to $N^{size,u}_{BWP,i}-1$, where i denotes a BWP number. The VRBs may be mapped to PRBs according to non-interleaved mapping. In some implementations, VRB n may be mapped to PRB n for non-interleaved VRB-to-PRB mapping.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS.

Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

Figure 6:
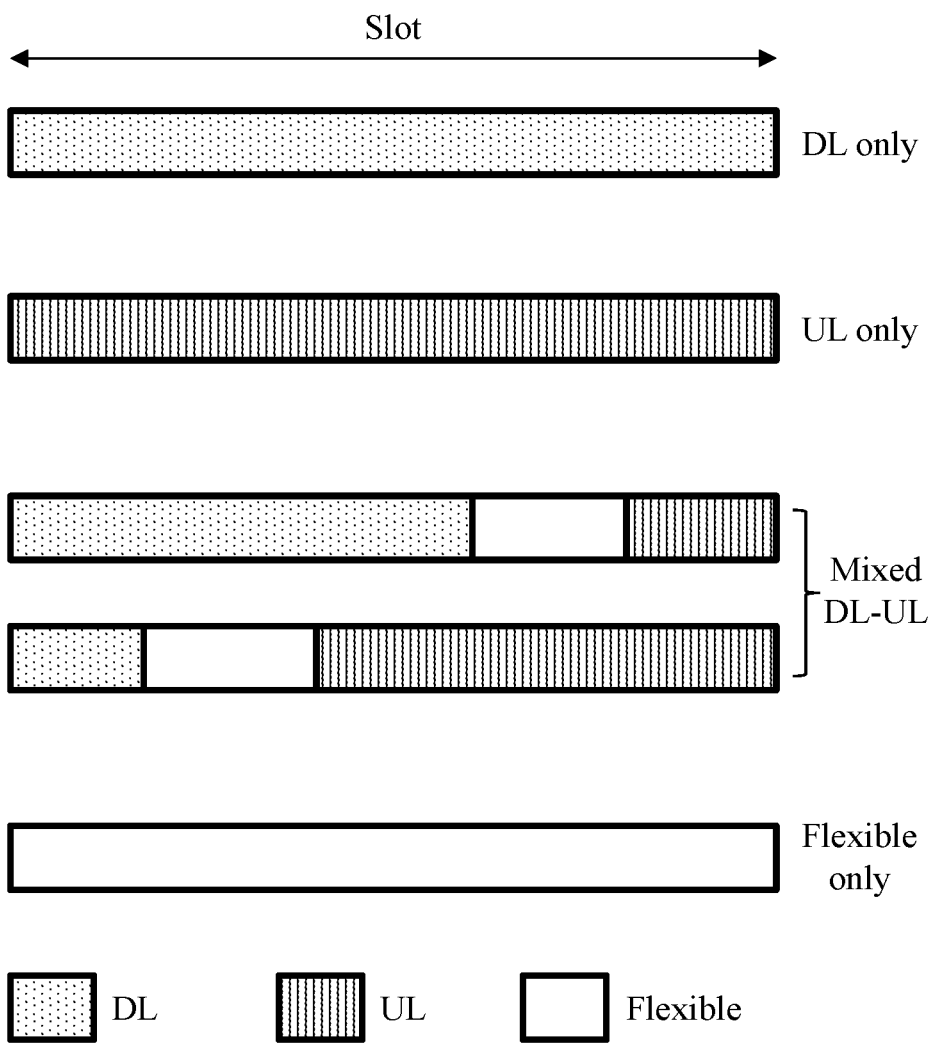
FIG. 6 illustrates slot structures used in a 3GPP-based system.

FIG. 6 illustrates slot structures used in a 3GPP-based system. In all 3GPP-based systems, for example, in an NR system, each slot may have a self-contained structure including i) a DL control channel, ii) DL or UL data, and/or iii) a UL control channel. For example, the first N symbols in a slot may be used to transmit the DL control channel (hereinafter, DL control region) and the last M symbols in a slot may be used to transmit the UL control channel (hereinafter, UL control region), where N and M are integers other than negative numbers. A resource region (hereinafter, data region) between the DL control region and the UL control region may be used to transmit DL data or UL data. Symbols in a single slot may be divided into group(s) of consecutive symbols that may be used as DL symbols, UL symbols, or flexible symbols. Hereinbelow, information indicating how each symbol in slot(s) is used will be referred to as a slot format. For example, which symbols in slot(s) are used for UL and which symbols in slot(s) are used for DL may be defined by a slot format.

When a BS intends to operate a serving cell in time division duplex (TDD) mode, the BS may configure a pattern for UL and DL allocation for the serving cell through higher layer (e.g., RRC) signaling. For example, the following parameters may be used to configure a TDD DL-UL pattern:

dl-UL-TransmissionPeriodicity that provides a periodicity of the DL-UL pattern;

nrofDownlinkSlots that provides the number of consecutive full DL slots at the beginning of each DL-UL pattern, where the full DL slots are slots having only DL symbols;

nrofDownlinkSymbols that provides the number of consecutive DL symbols at the beginning of a slot immediately following the last full DL slot;

nrofUplinkSlots that provides the number of consecutive full UL slots at the end of each DL-UL pattern, where the full UL slots are slots having only UL symbols; and nrofUplinkSymbols that provides the number of consecutive UL symbols in the end of a slot immediately preceding the first full UL slot.

The remaining symbols that are not configured as either DL symbols or UL symbols among symbols in the DL-UL pattern are flexible symbols.

If the UE is provided with a configuration for the TDD DL-UL pattern, i.e., a TDD UL-DL configuration (e.g., tdd-UL-DL-ConfigurationCommon, or tdd-UL-DLConfigurationDedicated), through higher layer signaling, the UE sets a slot format per slot over a number of slots based on the configuration.

For symbols, although there may be various combinations of DL symbols, UL symbols, and flexible symbols, a predetermined number of combinations may be predefined as slot formats and the predefined slot formats may be respectively identified by slot format indexes. The following table shows a part of the predefined slot formats. In the table below, D denotes a DL symbol, U denotes a UL symbol, and F denotes a flexible symbol.

TABLE 3

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... | | | | | | | ... | | | | | | | |

To indicate which slot format is used in a specific slot among the predefined slot formats, the BS may configure a set of slot format combinations applicable to a corresponding serving cell per cell with respect to a set of serving cells through higher layer (e.g., RRC) signaling and cause the UE to monitor a group-common PDCCH for slot format indicator(s) (SFI(s)) through higher layer (e.g., RRC) signaling. Hereinafter, DCI carried by the group-common PDCCH for the SFI(s) will be referred to as SFI DCI. DCI format 2_0 is used as the SFI DCI. For example, for each serving cell in a set of serving cells, the BS may provide the UE with the (start) position of a slot format combination ID (i.e., SFI-index) for a corresponding serving cell in the SFI DCI, a set of slot format combinations applicable to the serving cell, and a reference sub carrier spacing configuration for each slot format in a slot format combination indicated by an SFI-index value in the SFI DCI. One or more slot formats are configured for each slot format combination in the set of the slot format combinations and the slot format combination ID (i.e., SFI-index) is assigned to the slot format combination. For example, when the BS intends to configure the slot format combination with N slot formats, N slot format indexes among slot format indexes for the predefined slot formats (e.g., see Table 3) may be indicated for the slot format combination. In order to configure the UE to monitor the group-common PDCCH for the SFIs, the BS informs the UE of an SFI-RNTI corresponding to an radio network temporary identifier (RNTI) used for an SFI and the total length of a DCI payload scrambled with the SFI-RNTI. Upon detecting the PDCCH based on the SFI-RNTI, the UE may determine slot format(s) for the corresponding serving cell from an SFI-index for the serving cell among SFI-indexes in the DCI payload in the PDCCH.

Symbols indicated as flexible symbols by the TDD DL-UL pattern configuration may be indicated as UL symbols, DL symbols, or flexible symbols by the SFI DCI. Symbols indicated as the DL/UL symbols by the TDD DL-UL pattern configuration are not overridden as the UL/DL symbols or the flexible symbols by the SFI DCI.

If the TDD DL-UL pattern is not configured, the UE determines whether each slot is used for UL or DL and determines symbol allocation in each slot based on the SFI DCI and/or on DCI for scheduling or triggering DL or UL signal transmission (e.g., DCI format 1_0, DCI format 1_1, DCI format 1_2, DCI format 0_0, DCI format 0_1, DCI format 0_2, or DCI format 2_3).

NR frequency bands are defined as two types of frequency ranges, i.e., FR1 and FR2. FR2 is also referred to as millimeter wave (mmW). The following table shows frequency ranges within which NR may operate.

TABLE 4

| Frequency Range designation | Corresponding frequency range | Subcarrier Spacing |
|---|---|---|
| FR1 | 410 MHz-7125 MHZ | 15, 30, 60 kHz |
| FR2 | 24250 MHz-52600 MHZ | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including information about resource allocation of the DL-SCH is referred to as PDSCH scheduling DCI, and DCI including information about resource allocation of the UL-SCH is referred to as PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. UCI types transmitted on the PUCCH may include hybrid automatic repeat request acknowledgement (HARQ-ACK) information, a scheduling request (SR), and channel state information (CSI). UCI bits may include HARQ-ACK information bits if any, SR information bits if any, link recovery request (LRR) information bits if any, and CSI bits if any. In the present disclosure, the HARQ-ACK information bits may correspond to a HARQ-ACK codebook. In particular, a bit sequence in which HARQ-ACK information bits are arranged according to a predetermined rule is called the HARQ-ACK codebook.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CRI), an SS/PBCH resource block indicator (SSBRI), and a layer indicator (LI). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

Link recovery request (LRR):

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 5.

(0) PUCCH format 0 (PF0 or F0)

Supported UCI payload size: up to K bits (e.g., K=2)

Number of OFDM symbols constituting a single PUCCH: 1 to X symbols (e.g., X=2)

Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)

Supported UCI payload size: up to K bits (e.g., K=2)

Number of OFDM symbols constituting a single PUCCH: Y to Z symbols (e.g., Y=4 and Z=14)

Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)

Supported UCI payload size: more than K bits (e.g., K=2)

Number of OFDM symbols constituting a single PUCCH: 1 to X symbols (e.g., X=2)

Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRB s, the number of symbols for PUCCH transmission, and/or the first symbol for PUCCH transmission.

(3) PUCCH Format 3 (PF3 or F3)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N^{PUCCH}_{symb}$ | Number of bits | Usage | Etc. |
|---|---|---|---|---|
| 0 | 1-2 | =2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2

PUCCH resource set #1, if 2<the number of UCI bits=<$N_1$

. . . .

PUCCH resource set #(K−1), if $N_{K-2}$<the number of UCI bits=<$N_{K-1}$

Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 5).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

Resource Allocation by PDCCH: Dynamic Grant/Assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$, resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. HARQ information on a DL-SCH or UL-SCH may include a new information indicator (NDI), transport block size (TBS), redundancy version (RV), and HARQ process ID (i.e., HARQ process number). The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 7:
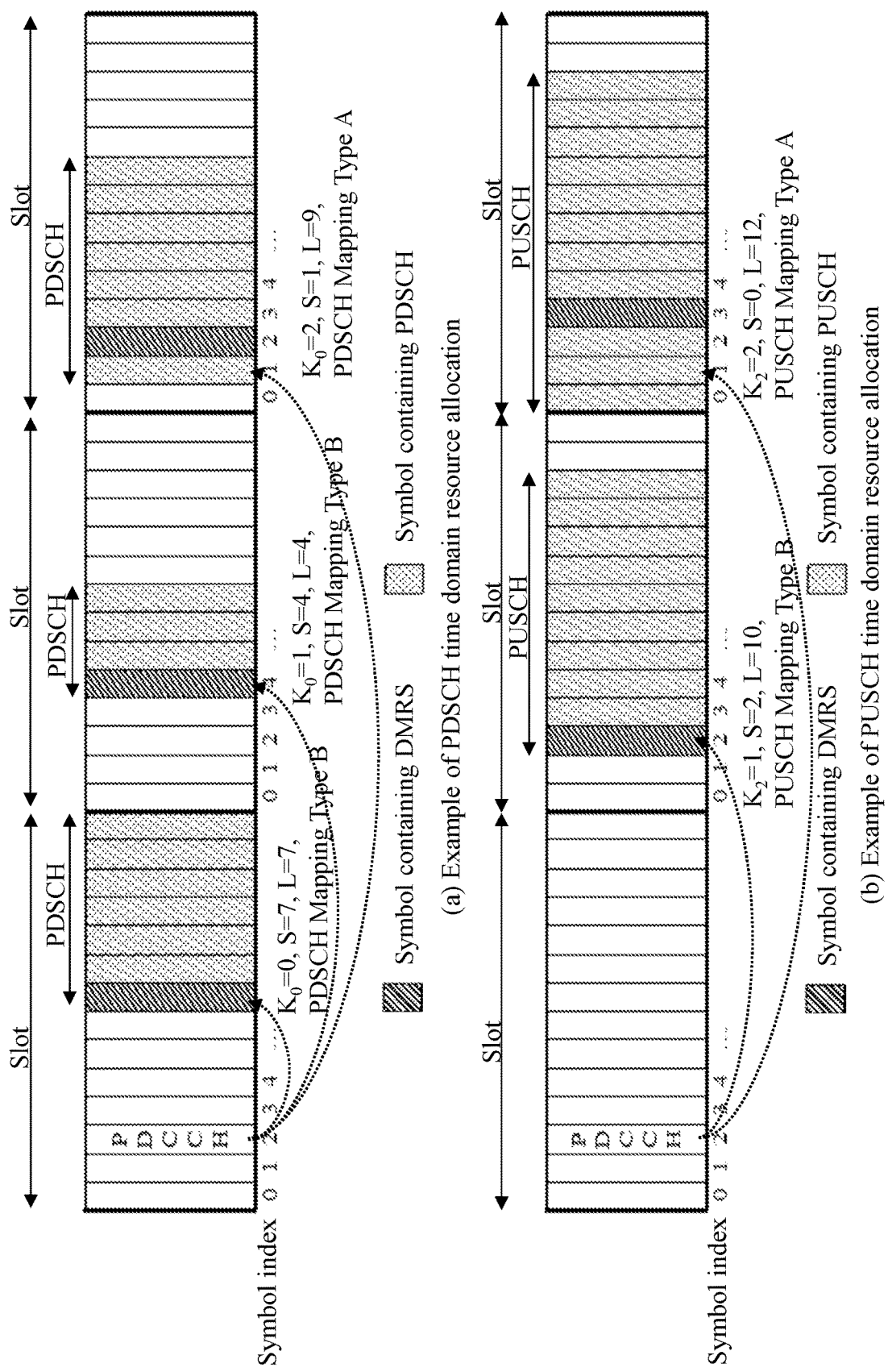
FIG. 7 illustrates an example of PDSCH time domain resource assignment (TDRA) caused by a PDCCH and an example of PUSCH TDRA caused by the PDCCH.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator value SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type has two mapping types: mapping type A and mapping type B. In PDSCH/PUSCH mapping type A, a demodulation reference signal (DMRS) is mapped to a PDSCH/PUSCH resource based on the start of a slot. According to other DMRS parameters, one or two symbols among the symbols of the PDSCH/PUSCH resource may be used as DMRS symbol(s). For example, in PDSCH/PUSCH mapping type A, the DMRS is located on the third symbol (symbol #2) or the fourth symbol (symbol #3) in the slot according to RRC signaling. In PDSCH/PUSCH mapping type B, the DMRS is mapped based on the first OFDM symbol of the PDSCH/PUSCH resource. According to other DMRS parameters, one or two symbols from the first symbol of the PDSCH/PUSCH resource may be used as DMRS symbol(s). For example, in PDSCH/PUSCH mapping type B, the DMRS is located on the first symbol allocated for PDSCH/PUSCH. In the present disclosure, the PDSCH/PUSCH mapping type may be referred to as a mapping type or a DMRS mapping type. For example, in the present disclosure, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:
  cs-RNTI corresponding to a CS-RNTI for retransmission;
  periodicity corresponding to a periodicity of configured grant Type 1;
  timeDomainOffset indicating an offset of a resource with respect to system frame number (SFN)=0 in the time domain;
  timeDomainAllocation value m that provides a row index m+1 pointing to the allocation table, indicating a combination of the start symbol S, the length L, and the PUSCH mapping type;
  frequencyDomainAllocation that provides frequency domain resource allocation; and
  mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:
  cs-RNTI corresponding to a CS-RNTI for activation, deactivation, and retransmission; and
  periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying: [(SFN*numberOfSlotsPerFrame*numberOfSymbolsPerSlot)+(slot number in the frame*numberOfSymbolsPerSlot)+symbol number in the slot]= [(SFN$_{start\ time}$*numberOfSlotsPerFrame*numberOfSymbolsPerSlot+slot$_{start\ time}$* numberOfSymbolsPerSlot+symbol$_{start\ time}$)+N*periodicity] modulo (1024*numberOfSlotsPerFrame*numberOfSym- bolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset and/or a parameter harq-ProcID-Offset2 used to derive HARQ process IDs for configured UL grants may be further provided by the BS to the UE. harq-ProcID-Offset is an offset of a HARQ process for a configured grant for operation with shared spectrum channel access, and harq-ProcID-Offset2 is an offset of a HARQ process for a configured grant. In the present disclosure, cg-RetransmissionTimer is a duration after (re)transmission based on a configured grant in which the UE should not autonomously perform retransmission based on the HARQ process of the (re)transmission. cg-RetransmissionTimer may be provided to the UE by the BS when retransmission on a configured UL grant is configured. For configured grants configured with neither harq-ProcID-Offset nor cg-Retransmission Timer, the HARQ process ID associated with the first symbol of UL transmission may be derived from the following equation: HARQ Process ID= [floor(CURRENT_symbol/periodicity)] modulo nrofHARQ-Processes. For configured UL grants with harq-ProcID-Offset2, the HARQ process ID associated with the first symbol of UL transmission may be derived from the following equation: HARQ Process ID=[floor(CURRENT_symbol/periodicity)] modulo nrofHARQ-Processes+harq-ProcID-Offset2, where CURRENT_symbol= (SFN*numberOfSlotsPerFrame*numberOfSymbolsPerSlot+slot number in the frame*numberOfSymbolsPerSlot+symbol number in the slot), and numberOfSlotsPerFrame and numberOfSymbolsPerSlot denote the number of consecutive slots per frame and the number of consecutive OFDM symbols per slot, respectively. For configured UL grants with cg-RetransmissionTimer, the UE may select a HARQ process ID from among HARQ process IDs available for the configured grant configuration.

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling used to configure a semi-persistent transmission:
  cs-RNTI corresponding to a CS-RNTI for activation, deactivation, and retransmission;
  nrofHARQ-Processes that provides the number of HARQ processes for SPS;
  periodicity that provides a periodicity of configured DL assignment for SPS;
  n1PUCCH-AN that provides a HARQ resource for a PUCCH for SPS (the network configures the HARQ resource as format 0 or format 1, and the actual PUCCH resource is configured by PUCCH-Config and referred to in n1PUCCH-AN by the ID thereof).

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start\ time}$+slot$_{start\ time}$)+N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset used to derive HARQ process IDs for configured DL assignments may be further provided by the BS to the UE. harq-ProcID-Offset is an offset of a HARQ process for SPS. For configured DL assignments without harq-ProcID-Offset, a HARQ process ID associated with a slot in which DL transmission starts may be determined from the following equation: HARQ Process ID=[floor (CURRENT_slot*10/(numberOfSlotsPerFrame*periodicity))] modulo nrof-HARQ-Processes, where CURRENT_slot=[(SFN*numberOfSlotsPerFrame)+slot number in the frame], and numberOfSlotsPerFrame denotes the number of consecutive slots per frame. For configured DL assignments with harq-ProcID-Offset, a HARQ process ID associated with a slot in which DL transmission starts may be determined from the following equation: HARQ Process ID=[floor (CURRENT_slot/periodicity)] modulo nrofHARQ-Processes+harq-ProcID-Offset, where CURRENT_slot=[(SFN*numberOfSlotsPerFrame)+slot number in the frame], and numberOfSlotsPerFrame denotes the number of consecutive slots per frame.

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 6 and Table 7. Table 6 shows an example of special fields for DL SPS and UL grant Type 2 scheduling activation PDCCH validation, and Table 7 shows an example of special fields for DL SPS and UL grant Type 2 scheduling release PDCCH validation.

TABLE 6

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

TABLE 7

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |

TABLE 7-continued

|  | DCI format 0_0 | DCI format 1_0 |
| --- | --- | --- |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

In the present disclosure, a PDSCH based on DL SPS may be referred to as an SPS PDSCH, and a PUSCH based on a UL configured grant (CG) may be referred to as a CG PUSCH. A PDSCH dynamically scheduled by DCI carried on a PDCCH may be referred to as a dynamic grant (DG) PDSCH, and a PUSCH dynamically scheduled by DCI carried by on a PDCCH may be referred to as a DG PUSCH.

Figure 8:
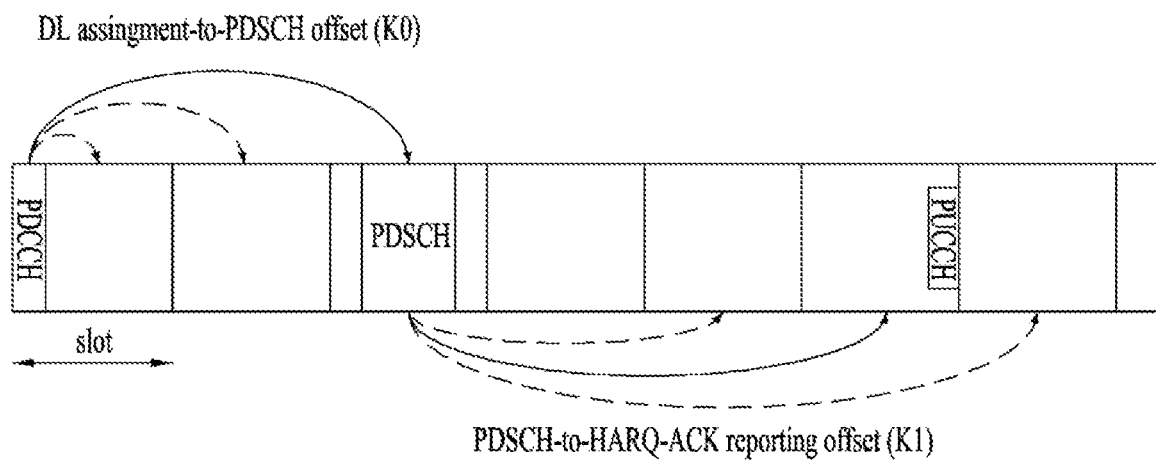
FIG. 8 illustrates a hybrid automatic repeat request-acknowledgement (HARQ-ACK) transmission/reception procedure.

FIG. 8 illustrates a HARQ-ACK transmission/reception procedure.

Referring to FIG. 8, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ_feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as a semi-static HARQ-ACK codebook and a dynamic HARQ-ACK codebook according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k∈{1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n−k). For example, when k∈{1, 2, 3, 4, 5, 6, 7, 8}, the HARQ-ACK information of slot #n may include HARQ-ACK corresponding to slot #(n−8) to slot #(n−1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. In the case of the dynamic HARQ-ACK codebook, the HARQ-ACK payload size that the UE is to report may be dynamically changed by the DCI etc. In the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

The semi-static HARQ-ACK codebook may be referred to as a Type-1 HARQ-ACK codebook, and the dynamic HARQ-ACK codebook may be referred to as a Type-2 HARQ-ACK codebook.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides parameters (e.g., CORESET #0 configuration) for monitoring a PDCCH for scheduling a PDSCH carrying system information block 1 (SIB1) to the UE. The PBCH may also indicate that there is no associated SIB1. In this case, the UE may be provided with not only a frequency range in which the UE may assume that there is no SSB associated with SSB1 but also other frequencies to search for an SSB associated with SIB1. CORESET #0, which is a CORESET for scheduling SIB1 at least, may be configured by the MIB or dedicated RRC signaling.

A set of PDCCH candidates monitored by the UE is defined in terms of PDCCH search space sets. The search space set may be a common search space (CSS) set or a UE-specific search space (USS) set. Each CORESET configuration is associated with one or more search space sets, and each search space set is associated with one CORESET configuration. The search space set is determined based on the following parameters provided by the BS to the UE.

controlResourceSetId: an identifier for identifying a CORESET p associated with a search space set s.

monitoringSlotPeriodicityAndOffset: a PDCCH monitoring periodicity of slots $k_s$ and a PDCCH monitoring offset of $o_s$ slots to configure slots for PDCCH monitoring.

duration: a duration of $T_s < k_s$ slots indicating a number of slots in which the search space set s exists.

monitoringSymbolsWithinSlot: a PDCCH monitoring pattern within a slot, indicating first symbol(s) of the CORESET within a slot for PDCCH monitoring.

nrofCandidates: a number of PDCCH candidates per CCE aggregation level.

searchSpaceType: an indication that search space set s is either a CCE set or a USS set.

The parameter monitoringSymbolsWithinSlot may indicate the first symbol(s) for PDCCH monitoring in the slots configured for PDCCH monitoring (e.g., see monitoringSlotPeriodicityAndOffset and duration). For example, when monitoringSymbolsWithinSlot is a 14-bit parameter, the most significant (leftmost) bit may represent the first OFDM symbol in the slot, and the second most significant (leftmost) bit may represent the second OFDM symbol in the slot. In this way, the bits of monitoringSymbolsWithinSlot may represent the 14 OFDM symbols of the slot, respectively. For example, bit(s) set to 1 among the bits in monitoringSymbolsWithinSlot may identify the first symbol(s) of the CORESET in the slot.

A UE monitors PDCCH candidates in PDCCH monitoring occasions only. The UE determines a monitoring occasion on an active DL BWP from the PDCCH monitoring periodicity, the PDCCH monitoring offset, and the PDCCH monitoring pattern within a slot. In some implementations, for search space set s, the UE determines that a PDCCH monitoring occasion(s) existing in a slot with number $n^u_{s,f}$ in a frame with number $n_f$ if $(n_f*N^{frame,u}_{slot}+n^u_{s,f}-o_s)$ mod $k_s=0$. The UE monitors PDCCH candidates for search space set s for $T_s$ consecutive slots, starting from slot $n^u_{s,f}$, and does not monitor PDCCH candidates for search space set s for the next $k_s-T_s$.

The following table shows search space sets, related RNTIs, and use cases thereof.

TABLE 8

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC- PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, of CS-RNTI(s) | User specific PDSCH decoding |

The following table shows DCI formats carried by a PDCCH.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of PRB(s) and OFDM symbol(s) where UE cancels the corresponding UL transmission from the UE |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. For a CSS, DCI format 0_0 and DCI format 1_0 have fixed sizes after the BWP size is initially given by RRC. For a USS, DCI format 0_0 and DCI format 1_0 are fixed in size in fields other than a frequency domain resource assignment (FDRA) field, and the FDRA field may vary in size by configuration of a related parameter by the BS. In DCI format 0_1 and DCI format 1_1, the size of the DCI field may be changed by various RRC reconfigurations by the BS. DCI format 2_0 may be used to provide dynamic slot format information (e.g., SFI DCI) to the UE, DCI format 2_1 may be used to provide DL pre-emption information to the UE, and DCI format 2_4 may be used to indicate a UL resource on which the UE needs to cancel UL transmission.

In a wireless communication system including the BS and the UE, when the UE transmits UCI on a PUCCH, a PUCCH resource may overlap with another PUCCH resource or a PUSCH resource on the time axis. For example, (1) a PUCCH (resource) and a PUCCH (resource) (for different UCI transmission) or (2) a PUCCH (resource) and a PUSCH (resource) may overlap on the time axis (in the same slot) in terms of the same UE. The UE may not support PUCCH-PUCCH simultaneous transmission or PUCCH-PUSCH simultaneous transmission (according to restrictions on UE capability or according to configuration information received from the BS). In addition, the UE may not be allowed to simultaneously transmit a plurality UL channels within a predetermined time range.

In the present disclosure, methods of handling a plurality of UL channels when the UL channels that the UE should transmit are present in a predetermined time range are described. In the present disclosure, methods of handling UCI and/or data that should have been transmitted/received on the UL channels are also described. The following terms are used in a description of examples in the present disclosure.

UCI: UCI implies control information that the UE transmits on UL. The UCI includes multiple types of control information (i.e., UCI types). For example, the UCI may include HARQ-ACK (shortly, A/N or AN), SR, and/or CSI.

UCI multiplexing: UCI multiplexing may mean an operation of transmitting different UCIs (UCI types) on a common physical UL channel (e.g., a PUCCH or PUSCH). UCI multiplexing may include multiplexing of different UCIs (UCI types). For convenience, the multiplexed UCI is referred to as MUX UCI. Further, UCI multiplexing may include an operation performed in relation to MUX UCI. For example, UCI multiplexing may include a process of determining a UL channel resource to transmit MUX UCI.

UCI/data multiplexing: UCI/data multiplexing may mean an operation of transmitting UCI and data on a common physical UL channel (e.g., PUSCH). UCI/data multiplexing may include an operation of multiplexing UCI with data. For example, the multiplexed UCI/data is referred to as MUX UCI/data. Further, UCI/data multiplexing may include an operation performed in relation to MUX UCI/data. For example, UCI/data multiplexing may include a process of determining a UL channel resource to transmit MUX UCI/data.

Slot: Slot means a basic time unit or time interval for data scheduling. A slot includes a plurality of symbols. Here, a symbol may be an OFDM-based symbol (e.g., a CP-OFDM symbol or DFT-s-OFDM symbol).

Overlapping UL channel resource(s): Overlapping UL channel resource(s) mean UL channel (e.g., PUCCH or PUSCH) resource(s) overlapping (at least partially) with each other on the time axis within a predetermined time period (e.g., slot). Overlapping UL channel resource(s) may imply UL channel resource(s) before UCI multiplexing is performed. In the present disclosure, (at least partially) overlapping UL channels on the time axis are referred to as colliding UL channels in time or in the time domain.

Figure 9:
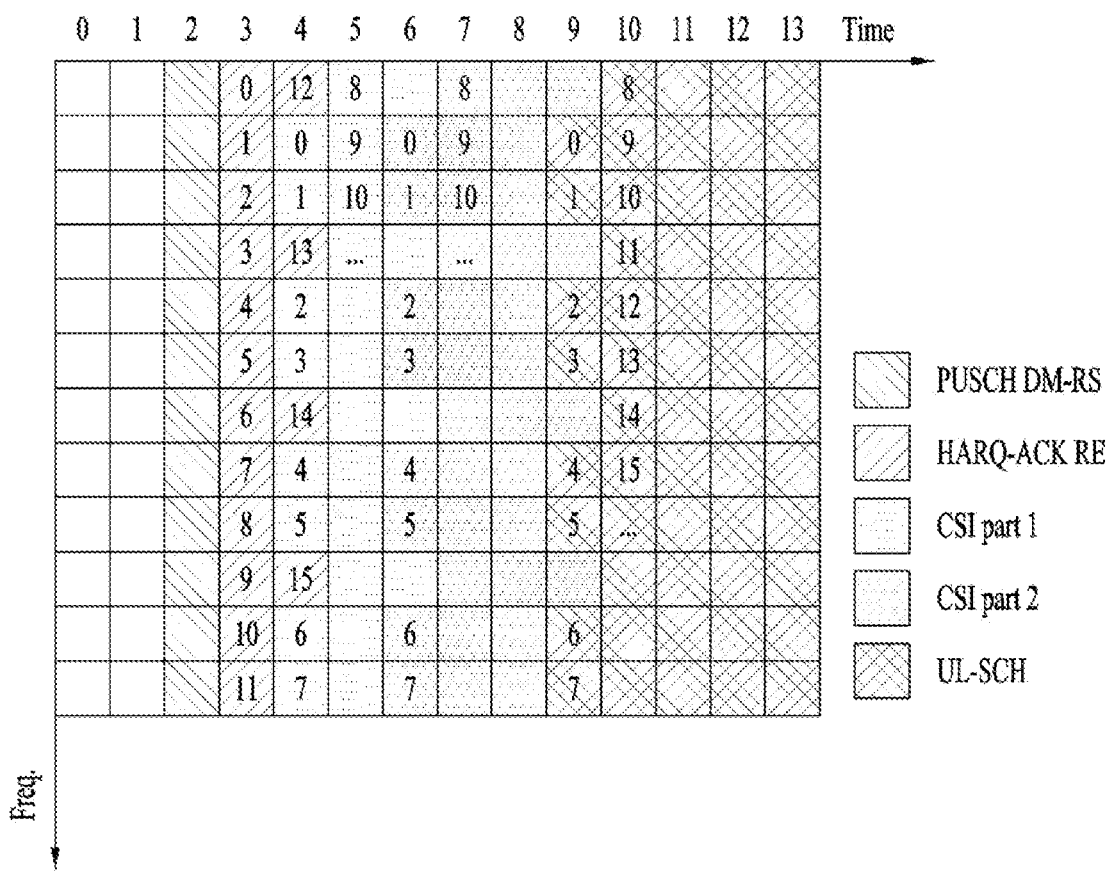
FIG. 9 illustrates an example of multiplexing uplink control information (UCI) with a PUSCH.

FIG. 9 illustrates an example of multiplexing UCI with a PUSCH. When PUCCH resource(s) and a PUSCH resource overlap in a slot and PUCCH-PUSCH simultaneous transmission is not configured, UCI may be transmitted on the PUSCH as illustrated. Transmission of the UCI on the PUSCH is referred to as UCI piggyback or PUSCH piggyback. Particularly, FIG. 9 illustrates the case in which HARQ-ACK and CSI are carried on the PUSCH resource.

When a plurality of UL channels overlaps within a predetermined time interval, a method for the UE to process the UL channels needs to be specified in order to allow the BS to correctly receive the UL channel(s). Hereinafter, methods of handling collision between UL channels will be described.

Figure 10:
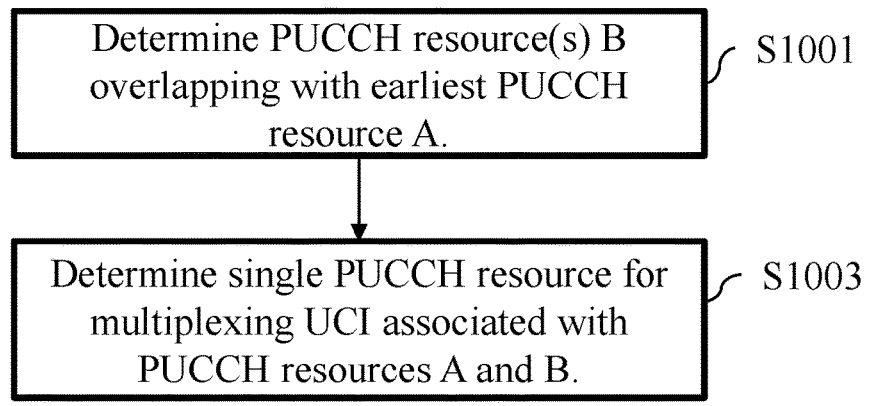
FIG. 10 illustrates an example of a process for a UE with overlapping PUCCHs in a single slot to handle collision between UL channels.

FIG. 10 illustrates an example of a process for a UE with overlapping PUCCHs in a single slot to handle collision between UL channels.

To transmit UCI, the UE may determine PUCCH resources for each UCI. Each PUCCH resource may be defined by a start symbol and a transmission interval. When PUCCH resources for PUCCH transmission overlap in a single slot, the UE may perform UCI multiplexing based on a PUCCH resource with the earliest start symbol. For example, the UE may determine overlapping PUCCH resource(s) (in time) (hereinafter, PUCCH resource(s) B) based on a PUCCH resource with the earliest start symbol (hereinafter, PUCCH resource A) in a slot (S1001). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. To multiplex UCI associated with the PUCCH resource A and the PUCCH resource(s) B, the UE may determine a single PUCCH resource (hereinafter, MUX PUCCH resource) (S1003). For example, the UE determines a PUCCH resource set corresponding to a payload size of the MUX UCI (hereinafter, PUCCH resource set X) among PUCCH resource sets configured or available for the UE and determines one of PUCCH resources belonging to the PUCCH resource set X as a MUX PUCCH resource. For example, the UE may determine one of the PUCCH resources belonging to the PUCCH resource set X as the MUX PUCCH resource, using a PUCCH resource indicator field in the last DCI among DCIs having a PDSCH-to-HARQ feedback timing indicator field that indicates the same slot for PUCCH transmission. The UE may determine the total number of PRBs of the MUX PUCCH resource based on the payload size of the MUX UCI and a maximum code rate for a PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or a PUCCH resource having the earliest start symbol among the other PUCCH resources including the MUX PUCCH resource).

Figure 11:
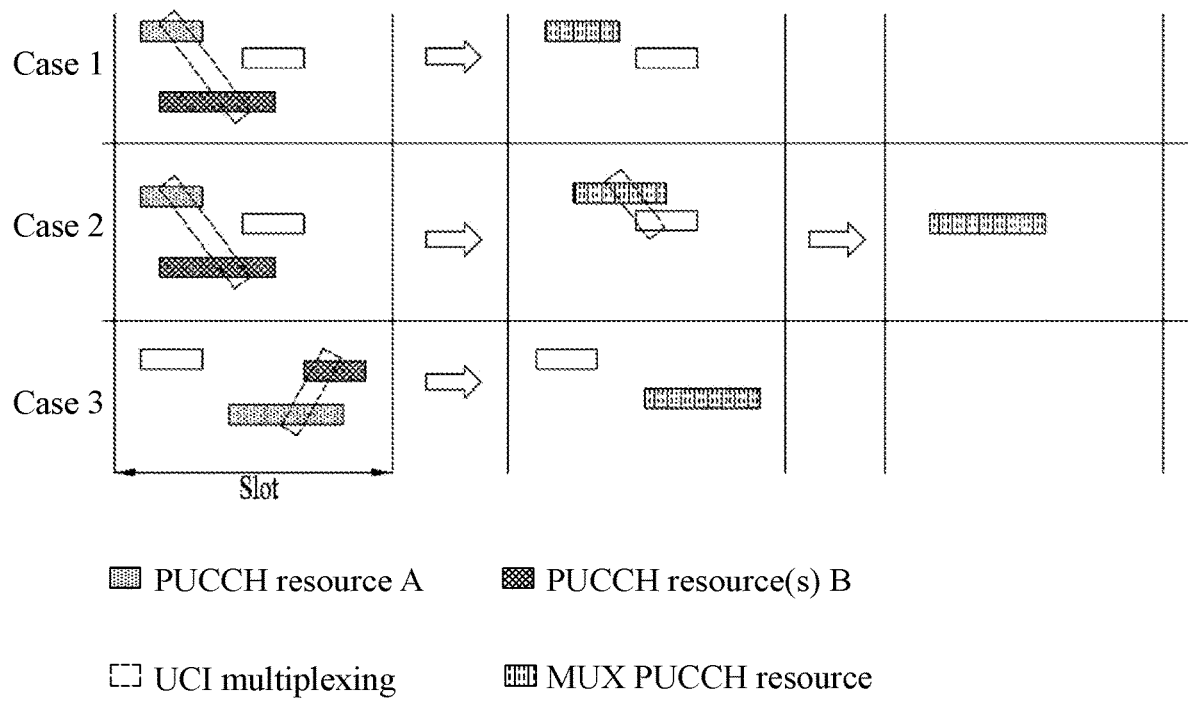
FIG. 11 illustrates cases for performing UCI multiplexing based on FIG. 9.

FIG. 11 illustrates cases for performing UCI multiplexing based on FIG. 10. Referring to FIG. 11, when a plurality of PUCCH resources overlap in a slot, UCI multiplexing may be performed based on the earliest PUCCH resource A (e.g., PUCCH resource A with the earliest start symbol). In FIG. 11, Case 1 and Case 2 show that the first PUCCH resource overlaps with another PUCCH resource. In this case, the process of FIG. 10 may be performed in a state in which the first PUCCH resource is regarded as the earliest PUCCH resource A. In contrast, Case 3 shows that the first PUCCH resource does not overlap with another PUCCH resource and the second PUCCH resource overlaps with another PUCCH resource. In Case 3, UCI multiplexing is not performed on the first PUCCH resource. Instead, the process of FIG. 10 may be performed in a state in which the second PUCCH resource is regarded as the earliest PUCCH resource A. Case 2 shows that a MUX PUCCH resource determined to transmit the multiplexed UCI newly overlaps with another PUCCH resource. In this case, the process of FIG. 10 may be additionally performed in a state in which the MUX PUCCH resource (or the earliest PUCCH resource (e.g., a PUCCH resource having the earliest start symbol) among the other PUCCH resources including the MUX PUCCH resource) is regarded as the earliest PUCCH resource A.

Figure 12:
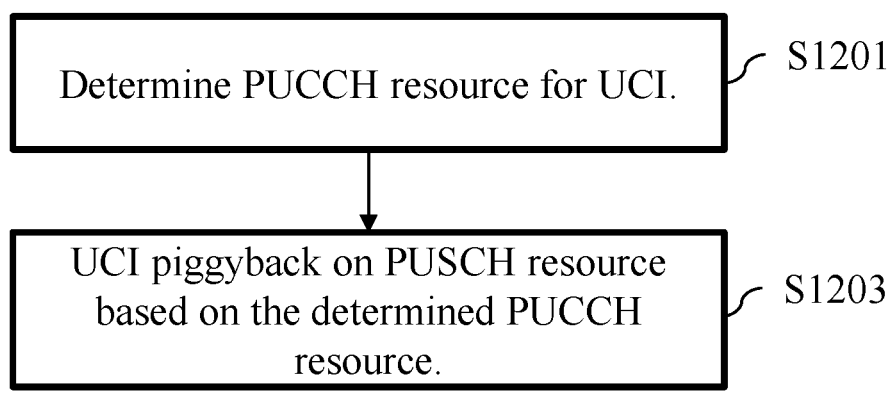
FIG. 12 illustrates a process for a UE with an overlapping PUCCH and PUSCH in a single slot to handle collision between UL channels.

FIG. 12 illustrates a process for a UE with an overlapping PUCCH and PUSCH in a single slot to handle collision between UL channels.

To transmit UCI, the UE may determine a PUCCH resource (S1201). Determination of the PUCCH resource for the UCI may include determining a MUX PUCCH resource. In other words, determination of the PUCCH resource for the UCI by the UE may include determining the MUX PUCCH resource based on a plurality of overlapping PUCCHs in a slot.

The UE may perform UCI piggyback on a PUSCH resource based on the determined (MUX) PUCCH resource (S1203). For example, when there is a PUSCH resource (on which multiplexed UCI transmission is allowed), the UE may apply the UCI multiplexing rule to PUCCH resource(s) overlapping with the PUSCH resource (on the time axis). The UE may transmit the UCI on the PUSCH.

When there is no PUSCH overlapping with the determined PUCCH resource in a slot, S1203 is omitted and the UCI may be transmitted on the PUCCH.

When the determined PUCCH resource overlaps with a plurality of PUSCHs on the time axis, the UE may multiplex the UCI with one of the PUSCHs. For example, when the UE intends to transmit the PUSCHs to respective serving cells, the UE may multiplex the UCI on a PUSCH of a specific serving cell (e.g., a serving cell having the smallest serving cell index) among the serving cells. When more than one PUSCH is present in the slot of the specific serving cell, the UE may multiplex the UCI on the earliest PUSCH transmitted in the slot.

Figure 13:
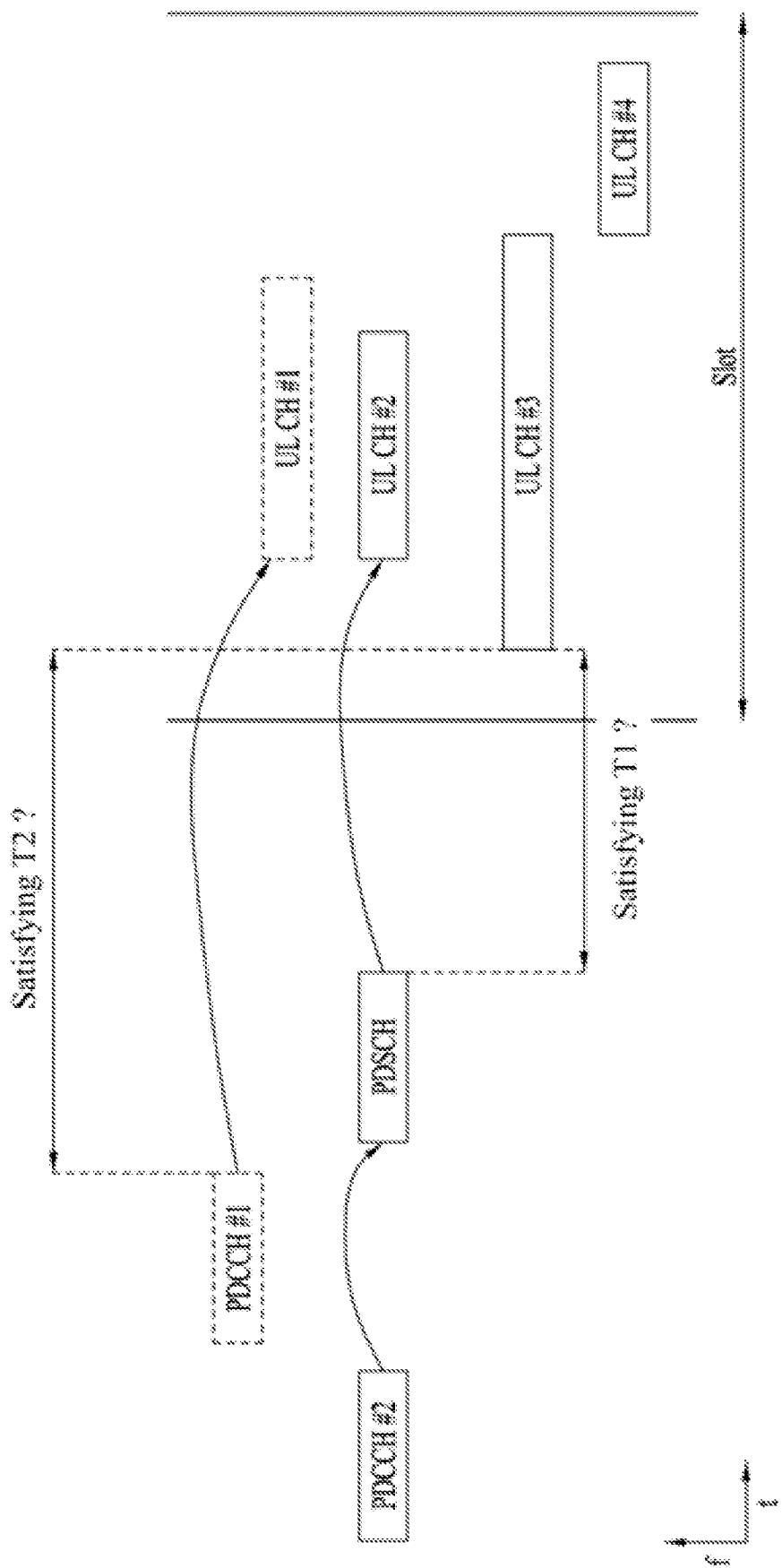
FIG. 13 illustrates UCI multiplexing considering a timeline condition.

FIG. 13 illustrates UCI multiplexing considering a timeline condition. When the UE performs UCI and/or data multiplexing for overlapping PUCCH(s) and/or PUSCH(s) on the time axis, the UE may be lacking in processing time for UCI and/or data multiplexing due to flexible UL timing configuration for the PUCCH or the PUSCH. In order to prevent the processing time of the UE from being insufficient, two timeline conditions (hereinafter, multiplexing timeline conditions) described below are considered in a process of performing UCI/data multiplexing for the overlapping PUCCH(s) and/or PUSCH(s) (on the time axis).

(1) The last symbol of a PDSCH corresponding to HARQ-ACK information is received before time T1 from the start symbol of the earliest channel among the overlapping PUCCH(s) and/or PUSCH(s) (on the time axis). T1 may be determined based on i) a minimum PDSCH processing time N1 defined according to a UE processing capability, and/or ii) $d_{1,1}$ predefined as an integer equal to or greater than 0 according to a position of scheduled symbol(s), PDSCH mapping type, BWP switching, etc.

For example, T1 may be determined as follows: $T1=(N1+d_{1,1})*(2048+144)*\kappa*2^{-u}*T_c$. N1 is based on u of Table 10 and Table 11 for UE processing capabilities #1 and #2, respectively, and u is one of ($u_{PDCCH}$, $u_{PDSCH}$, $u_{UL}$), that causes the largest T1, where $u_{PDCCH}$ corresponds to a subcarrier spacing of a PDCCH for scheduling the PDSCH, $u_{PDSCH}$ corresponds to a subcarrier spacing of the scheduled PDSCH, $u_{UL}$ corresponds to a subcarrier spacing of a UL channel on which HARQ-ACK is to be transmitted, and $\kappa=T_c/T_f=64$. In Table 10, in the case of $N_{1,0}$, if a PDSCH DMRS position of an added DMRS is $l_1=12$, then $N_{1,0}=14$ and, otherwise, $N_{1,0}=13$ (refer to Section 7.4.1.1.2 of 3GPP TS 38.211). If the last symbol of the PDSCH for PDSCH mapping type A is present on an i-th slot, $d_{1,1}=7-i$ for $i<7$ and, otherwise, $d_{1,1}=0$. If the PDSCH has mapping type B for UE processing capability #1, $d_{1,1}$ may be 0 when the number of allocated PDSCH symbols is 7, $d_{1,1}$ may be 3 when the number of allocated PDSCH symbols is 4, $d_{1,1}$ may be 3+d when the number of allocated PDSCH symbols is 2, where d is the number of overlapping symbols of the scheduling PDCCH and the scheduled PDSCH. If the PDSCH mapping type is B for UE processing capability #2, $d_{1,1}$ may be 0 when the number of allocated PDSCH symbols is 7, and $d_{1,1}$ may correspond to the number of overlapping symbols of the scheduling PDCCH and the scheduled PDSCH when the number of allocated PDSCH symbols is 4. Further, if the number of allocated PDSCH symbols is 2, $d_{1,1}$ may be 3 when the scheduling PDSCH is within a 3-symbol CORESET and the CORESET and the PDSCH have the same starting symbol, and $d_{1,1}$ may be the number of overlapping symbols of the scheduling PDCCH and the scheduled PDSCH for the other cases. In the present disclosure T1 may also be referred to as T_proc,1.

(2) The last symbol of a (e.g., triggering) PDCCH for indicating PUCCH or PUSCH transmission is received before time T2 from the start symbol of the earliest channel among overlapping PUCCH(s) and/or PUSCH(s) (on the time axis). T2 may be determined based on i) a minimum PUSCH preparation time N1 defined according to a UE PUSCH timing capability, and/or ii) $d_{2,x}$ predefined as an integer equal to or greater than 0 according to the scheduled symbol position, BWP switching, etc. $d_{2,x}$ may be categorized into $d_{2,1}$ related to the position of scheduled symbol(s) and $d_{2,2}$ related to BWP switching.

For example, T2 may be determined as follows: T2=max $\{(N2+d_{2,1})*(2048+144)*\kappa*2^{-u}*T_c+T_{ext}+T_{switch}, d_{2,2}\}$. N2 is based on u of Table 12 and Table 13 for UE timing capabilities #1 and #2, respectively, and u is one of ($u_{DL}$, $u_{UL}$), that causes the largest T1, where $u_{DL}$ corresponds to a subcarrier spacing of a PDCCH carrying DCI for scheduling a PUSCH, $u_{UL}$ corresponds to a subcarrier spacing of the PUSCH, and $\kappa=T_c/T_f=64$. If the first symbol of PUSCH allocation is composed only of a DMRS, then $d_{2,1}$ may be 0 and, otherwise, $d_{2,1}$ may be 1. If the scheduling DCI has triggered BWP switching, $d_{2,2}$ is equal to a switching time and, otherwise, $d_{2,2}$ is 0. The switching time may be differently defined depending on a frequency range (FR). For example, the switching time may be defined as 0.5 ms for FR1 and as 0.25 ms for FR2. In the present disclosure, T2 may also be referred to as T_proc,2.

Tables below show processing times according to UE processing capability. Particularly, Table 10 shows a PDSCH processing time for PDSCH processing capability #1 of the UE, Table 11 shows a PDSCH processing time for PDSCH processing capability #2 of the UE, Table 12 shows a PUSCH preparation time for PUSCH timing capability #1 of the UE, and Table 13 shows a PUSCH processing time for PUSCH timing capability #2 of the UE.

TABLE 10

| | PDSCH decoding time $N_1$ [symbols] | |
| --- | --- | --- |
| u/SCS | Front-loaded DMRS only | Front-loaded + additional DMRS |
| 0/15 kHz | 8 | $N_{1,0}$ |
| 1/30 kHz | 10 | 13 |
| 2/60 kHz | 17 | 20 |
| 3/120 kHz | 20 | 24 |

TABLE 11

| u/SCS | PDSCH decoding time $N_1$ [symbols] |
| --- | --- |
| 0/15 kHz | 3 |
| 1/30 kHz | 4.5 |
| 2/60 kHz | 9 for frequency range 1 |

TABLE 12

| u/SCS | PUSCH preparation time $N_2$ [symbols] |
| --- | --- |
| 0/15 kHz | 10 |
| 1/30 kHz | 12 |
| 2/60 kHz | 23 |
| 3/120 kHz | 36 |

TABLE 13

| u/SCS | PUSCH preparation time $N_2$ [symbols] |
| --- | --- |
| 0/15 kHz | 5 |
| 1/30 kHz | 5.5 |
| 2/60 kHz | 11 for frequency range 1 |

The UE may report a PDSCH processing capability supported thereby with respect to carriers corresponding to one band entry within a band combination to the BS. For example, the UE may report a UE capability regarding whether the UE supports PDSCH processing capability #1 only or supports PDSCH processing capability #2, with respect to each SCS supported in a corresponding band. The UE may report a PUSCH processing capability supported thereby with respect to carriers corresponding to one band entry within a band combination. For example, the UE may report a UE capability regarding whether the UE supports PUSCH processing capability #1 only or supports PUSCH processing capability #2, with respect to each SCS supported in a corresponding band.

If the UE configured to multiplex different UCI types within one PUCCH intends to transmit a plurality of overlapping PUCCHs in a slot or transmit overlapping PUCCH(s) and PUSCH(s) in a slot, the UE may multiplex the UCI types when specific conditions are fulfilled. The specific conditions may include multiplexing timeline condition(s). For example, PUCCH(s) and PUSCH(s) to which UCI multiplexing is applied in FIGS. 10 to 12 may be UL channels that satisfy the multiplexing timeline condition(s). Referring to FIG. 13, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for a PDSCH. The PDSCH is scheduled by PDCCH #2 and a resource of UL CH #2 may also be indicated by PDCCH #2.

In this case, if overlapping UL channels (e.g., UL channels #1 to #3) on the time axis satisfy the multiplexing timeline condition, the UE may perform UCI multiplexing for overlapping UL channels #1 to #3 on the time axis. For example, the UE may check whether the first symbol of UL CH #3 from the last symbol of the PDSCH satisfies the condition of T1. The UE may also check whether the first symbol of UL CH #3 from the last symbol of PDCCH #1 satisfies the condition of T2. If the multiplexing timeline condition is satisfied, the UE may perform UCI multiplex for UL channels #1 to #3. In contrast, if the earliest UL channel (e.g., UL channel having the earliest start symbol) among overlapping UL channels does not satisfy the multiplexing timeline condition, the UE may not be allowed to multiplex all of the corresponding UCI types.

Figure 14:
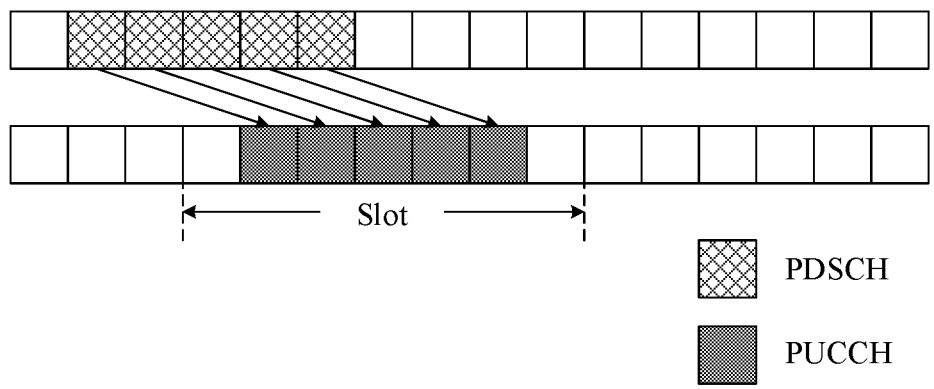
FIG. 14 illustrates transmission of a plurality of HARQ-ACK PUCCHs in a slot.

FIG. 14 illustrates transmission of a plurality of HARQ-ACK PUCCHs in a slot.

In some scenarios, it is regulated that a UE is not expected to transmit more than one PUCCH with HARQ-ACK information in a slot. Thus, according to these scenarios, the UE may transmit at most one PUCCH with HARQ-ACK information in one slot. In order to prevent a situation in which the UE fails to transmit the HARQ-ACK information due to restrictions on the number of HARQ-ACK PUCCHs transmittable by the UE, the BS needs to perform DL scheduling so that the HARQ-ACK information may be multiplexed on one PUCCH resource. However, when taking into consideration a service with stringent latency and reliability requirements, such as a URLLC service, a scheme of concentrating a plurality of HARQ-ACK feedbacks only on one PUCCH in a slot may not be desirable in terms of PUCCH performance. Furthermore, in order to support a latency-critical service, the BS may be required to schedule a plurality of consecutive PDSCHs with a short duration in one slot. Although the UE may transmit a PUCCH in random symbol(s) in a slot by the configuration/indication of the BS, if the UE is allowed to transmit only a maximum of one HARQ-ACK PUCCH in a slot, it may be impossible for the BS to perform fast back-to-back scheduling for PDSCHs and for the UE to perform fast HARQ-ACK feedback. Accordingly, in order to flexibly and efficiently use resources and support services, it is better to allow transmission of a plurality of (non-overlapping) HARQ-ACK PUCCHs (or PUSCHs) in one slot as illustrated in FIG. 14. Thus, in some scenarios, PUCCH feedback based on a subslot consisting of fewer (e.g., 2 or 7 OFDM symbols) than 14 OFDM symbols as well as PUCCH feedback based on a slot consisting of 14 OFDM symbols may be considered.

Separate codebooks may be formed/generated for HARQ-ACK feedback for a plurality of DL data channels (e.g., a plurality of PDSCHs) having different service types, different quality of service (QoS), different latency requirements, different reliability requirements, and/or different priorities. For example, a HARQ-ACK codebook for PDSCH(s) associated with high priority and a HARQ-ACK codebook for PDSCH(s) associated with low priority may be separately configured/formed. For HARQ-ACK feedback for PDSCHs with different priorities, different parameters and different resource configurations may be considered for PUCCH transmissions with different priorities (see the information element (IE) pucch-ConfigurationList of 3GPP TS 38.331). The unit of a time difference (e.g., a PDSCH-to-HARQ_ feedback timing indicator) between a DL data channel and a PUCCH for HARQ-ACK feedback transmission may be determined by a predetermined subslot length (e.g., the number of symbols included in a subslot). For example, the unit of the time difference from the DL data channel to the PUCCH for HARQ-ACK feedback transmission may be configured by a parameter "subslotLengthForPUCCH" in PUCCH-Config, which is configuration information used to configure UE-specific PUCCH parameters. According to these scenarios, the length unit of the PDSCH-to-HARQ feedback timing indicator may be configured for each HARQ-ACK codebook.

In some scenarios (e.g., 3GPP NR Rel-16), if the UE receives a PDSCH scheduled by the BS, the UE may transmit a PUCCH carrying a HARQ-ACK for the PDSCH (hereinafter, HARQ-ACK PUCCH) at a time designated by scheduling information regarding the PDSCH. This is one of the methods in which the UE and BS assume the same PUCCH transmission time in order to allow the BS to successfully receive a PUCCH transmitted from the UE.

These series of operations may always cause the UE to transmit a PUCCH after a predetermined time from reception of a semi-statically configured SPS PDSCH. As a result, PUCCH transmission may be easily canceled by a TDD pattern that is not aligned with the period of the SPS PDSCH may be used, or the dynamic TDD operation of the BS. In addition, PDSCH transmission associated with the canceled PUCCH transmission may also be canceled, or retransmission may be required. To solve these problems, an operation in which the UE defers a PUCCH timing determined for a PDSCH according to a predetermined method or in an arbitrary manner, that is, delaying operation is being considered. However, when the UE arbitrarily defers the PUCCH timing, it may result in collisions between the delayed PUCCH and other channels. If the delayed PUCCH overlaps in time with a non-delayed PUCCH, UL multiplexing between the delayed PUCCH and the non-delayed PUCCH may be problematic.

In the present disclosure, method(s) of configuring a HARQ-ACK codebook available for PUCCH transmission when the UE transmits the HARQ-ACK PUCCH later than previously allocated information will be described. In addition, method(s) for resolving a collision between overlapping channels when a delayed PUCCH overlaps in time with a PDSCH or PUSCH will be described.

According to some implementations of the present disclosure, when the UE delays PUCCH transmission according to a predetermined rule or in an arbitrary way, the delayed PUCCH transmission and related UCI may be piggybacked on different delayed PUCCH transmission and/or non-delayed PUCCH transmission. In the present disclosure, method(s) and procedure(s) for configuring a semi-static HARQ-ACK codebook (hereinafter, Type-1 HARQ-ACK codebook) and a dynamic HARQ-ACK codebook (hereinafter, Type-2 HARQ-ACK codebook) when a plurality of delayed PUCCH transmissions overlap in time with each other or when one or more delayed PUCCH transmissions overlaps in time with one or more non-delayed PUCCH transmissions will be described.

Figure 15:
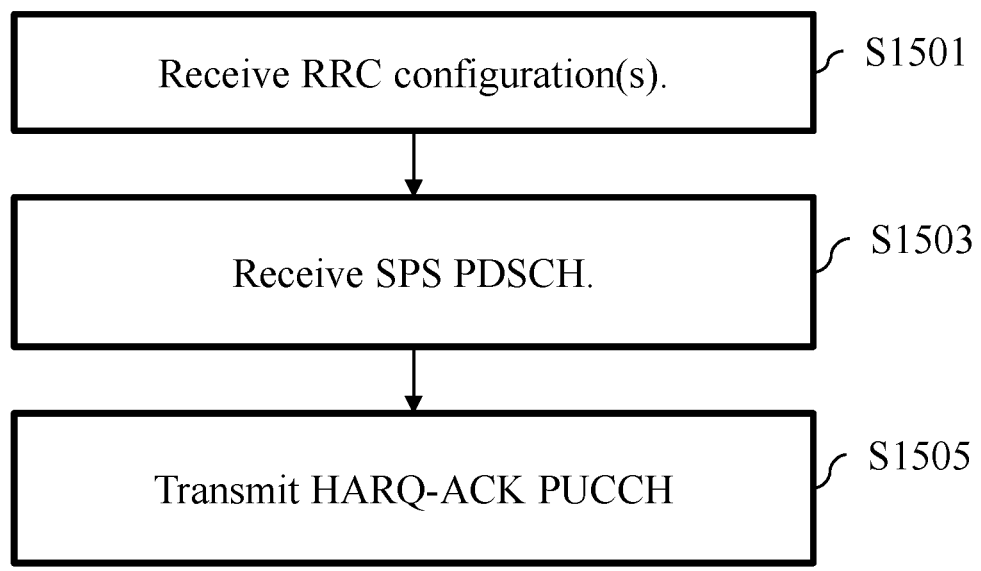
FIG. 15 illustrates a flow of UL channel transmission at a UE according to some implementations of the present disclosure.

UE Side:

FIG. 15 illustrates a flow of UL channel transmission at a UE according to some implementations of the present disclosure.

The UE may receive higher layer (e.g., RRC) parameter(s) for configuring PUCCH transmissions and slot formats. The UE may be scheduled with a PDSCH in DCI from the BS or receive a PDSCH based on higher layer (e.g., RRC) configurations and SPS activation DCI. Then, the UE may transmit a PUCCH in response to the PDSCH. The UE may delay a specific PUCCH transmission among PUCCH transmissions based on a slot format. Alternatively, if the delayed PUCCH transmission overlaps with another channel, the UE may cancel the delayed PUCCH transmission, multiplex the delay PUCCH transmission with the other channel, and/or receive/transmit the other channel according to some implementations of the present disclosure. For example, when the delayed PUCCH transmission overlaps in time with another PUCCH transmission, the delayed PUCCH transmission and the other PUCCH transmission may be multiplexed. In some implementations of the present disclosure, the UE may operate as follows.

The UE may receive one or more RRC configurations for SPS PDSCH reception and PUCCH transmission from the BS (S1501). In some implementations, the RRC configurations may be provided separately for each SPS PDSCH configuration.

The UE may receive an SPS PDSCH activation indication from the BS. The UE may receive an SPS PDSCH based on the SPS PDSCH activation indication and the RRC configuration for SPS PDSCH reception (S1503).

The UE may transmit a HARQ-ACK PUCCH for the received SPS PDSCH based on the SPS PDSCH activation indication and the RRC configuration for PUCCH transmission (S1505). If a configured HARQ-ACK PUCCH resource is not available for the transmission due to an indication through L1 signaling from the BS and/or a configuration through higher layer signaling from the BS, the UE may delay the PUCCH transmission. For example, the PUCCH transmission or UCI transmission may be delayed to the following resources:

Next available UL symbol/slot/subslot,
Next PUCCH scheduled via DCI,
Next PUCCH resource configured for same or different SPS PDSCH configurations, or
Slot/subslot mapped to next K1 value or K1 value configured for delaying.

According to some implementations of the present disclosure, if a delayed PUCCH overlaps in time with another PUCCH transmission, the UE may multiplex the PUCCH transmissions and UCIs to be transmitted according to the following method(s), which will be described below. Alternatively, according to some implementations of the present disclosure, if a delayed PUCCH overlaps (in time) with a PDSCH, the UE may perform either transmission of the delayed PUCCH or reception of the PDSCH according to the following method(s).

In some implementations of the present disclosure, the following UE operation(s) may be considered.

<Implementation A1> Delaying HARQ-ACK to Next K1 Value

The UE may transmit a HARQ-ACK PUCCH for a received PDSCH based on DL scheduling information from the BS and an RRC configuration (e.g., an IE PUCCH-config) related to PUCCH transmission. If a configured HARQ-ACK PUCCH resource is not available for the transmission due to an indication through L1 signaling (e.g., PDCCH) from the BS and/or a configuration through higher layer (e.g., RRC) signaling from the BS, the UE may delay the PUCCH transmission. In this case, the UE may delay the PUCCH transmission as follows.

When the BS schedules a PDSCH, the BS may indicate or configure a slot or subslot interval $K_1$ from the end of the PDSCH to PUCCH transmission associated with the PDSCH. To this end, the BS may configure a set of $K_1$ values through a higher layer (RRC) parameter (e.g., dl-DataToUL-ACK) to inform the UE of a slot or subslot for transmitting the PUCCH after PDSCH reception. The BS may indicate one value in the set of $K_1$ values to the UE through a PDSCH-to-HARQ_ACK timing indicator field included in DCI. For example, if the set of $K_1$ values is given as $\{X_1, X_2, X_3, \ldots, X_N\}$, and if the PUCCH transmission for the PDSCH for which $X_a$ is indicated as the K1 value needs to be delayed, a PUCCH resource, which is to be used when $X_{a+1}$ is indicated for the PDSCH, may be used for the PUCCH transmission.

Alternatively, a PUCCH resource, which is to be used when $X_b$ is indicated as the K1 value for the PDSCH, may be used for the delayed PUCCH transmission. In this case, b has a value greater than a, which may be the first index among K1 indices that indicate slots or subslots in which indicated PUCCH resources do not overlap with DL symbols.

Alternatively, a subset of K1 values to be used for the delayed PUCCH transmission may be preconfigured. For example, when the subset is $\{X'_1, X'_2, X'_3, \ldots, X'_N\}$, if $X'_a$, one element of the subset is indicated as the K1 value while the corresponding PDSCH is scheduled, a PUCCH resource to be used when $X'_{a+1}$ is indicated as the K1 value may be used for the delayed PUCCH transmission.

When there are no available K1 values within a given K1 set or subset, or when an initially given K1 value is the largest value in the K1 set, the UE may cancel the PUCCH transmission.

When the length of a maximum time delay T is configured by L1 signaling or higher layer (RRC) signaling from the BS, and when the UE uses $X_B$ to support the PUCCH, instead of using $X_A$, which is indicated as the K1 value, $X_B$ may be limited to satisfy the following relationship: $X_B - X_A < T$.

<Implementation A1-1> Maximum Delay Allowed for PUCCH (Maximally Allowed Delay for PUCCH)

When a configured HARQ-ACK PUCCH resource is not available for transmission due to an indication through L1 signaling from the BS and/or a configuration through higher layer (e.g., RRC) signaling from the BS, the UE may delay PUCCH transmission. In this case, the length of a maximum time delay T may be defined as follows.

T may be determined through L1 signaling and/or higher layer signaling from the BS or may have a predetermined value (e.g., 14 symbols). If a predefined value N (e.g., 1) is given through L1 signaling and/or higher layer signaling from the BS, T may be N symbol(s)/N subslot(s)/N slot(s). Whether a subslot or slot is used may be determined according to a HARQ-ACK codebook used for an associated SPS configuration and the length of a PUCCH slot used in a PUCCH configuration (e.g., PUCCH-config) used for the HARQ-ACK codebook. Alternatively, if there is a PUCCH configuration associated with the value of N, T may be determined according to the length of a PUCCH slot defined in the PUCCH configuration.

T may be determined through L1 signaling and/or higher layer (e.g., RRC) signaling from the BS or may have a predetermined value (e.g., 14 symbols). If a predefined value N (e.g., 1) is given through L1 signaling and/or higher layer signaling from the BS, T may be N*P symbols, where P may correspond to a configured period of an SPS PDSCH associated with a delayed PUCCH.

T may be determined through L1 signaling and/or higher layer (e.g., RRC) signaling from the BS or may have a predetermined value (e.g., 14 symbols). If a predefined value N (e.g., 1) is given through L1 signaling and/or higher layer signaling from the BS, T may be a time interval from the originally indicated starting symbol of a delayed PUCCH to the starting symbol of a PUCCH occasion only for SPS PDSCH HARQ-ACK, which is an N-th PUCCH occasion generated from the initially indicated ending symbol of the delayed PUCCH, among PUCCH occasions only for SPS PDSCH HARQ-ACK. In this case, the PUCCH occasion only for SPS PDSCH HARQ-ACK may be determined in consideration of only an SPS configuration associated with the delayed PUCCH or all PUCCH occasions only for SPS PDSCH HARQ-ACK, which are configured or configured and activated for the UE.

In Implementation A1-1, the L1 signaling from the BS for determining T may be activation DCI associated with an SPS PDSCH to which the maximum time delay length T is applicable.

If the starting symbol of the delayed PUCCH is delayed the time T after the ending symbol of an associated PDSCH or after the starting or ending symbol of the originally indicated PUCCH, the UE may drop HARQ-ACK transmission without performing the corresponding PUCCH transmission (or by cancelling the PUCCH transmission).

Alternatively, the UE may determine UL symbol(s)/subslot(s)/slot(s) available to delay the PUCCH. Alternatively, when selecting one of candidate K1 values, the UE may determine UL symbol(s)/subslot(s)/slot(s) such that the starting symbol of the delayed PUCCH is not delayed after the lapse of the time T from the ending symbol of the associated PDSCH or from the starting or ending symbol of the originally indicated PUCCH. Alternatively, the UE may select one of the candidate K1 values. If such UL symbol(s)/subslot(s)/slot(s) do not exist, or if there are no K1 values, the UE may drop the HARQ-ACK transmission without performing the corresponding PUCCH transmission (or by cancelling the PUCCH transmission).

<Implementation A2> How to Construct Type-1 Delayed HARQ-ACK Codebook

When the UE delays a indicated or configured PUCCH transmission to a later symbol/subslot/slot different from a symbol/subslot/slot, which is based on indicated or configured scheduling information, and when the delayed PUCCH transmission overlaps in time with another PUCCH transmission, the UE may multiplex HARQ-ACK information to be transmitted on overlapping PUCCHs onto a Type-1 HARQ-ACK codebook according to the following methods. The Type-1 HARQ-ACK codebook is a HARQ-ACK codebook in which the HARQ-ACK payload size does not change according to dynamic scheduling. For example, HARQ-ACK information generated by the HARQ-ACK codebook determination method defined in Section 9.1.2 of 3GPP TS 38.213 may be the Type-1 HARQ-ACK codebook.

Option 1: When a PUCCH carrying a HARQ-ACK is delayed, a UL slot or subslot to which transmission of the HARQ-ACK is delayed (i.e., slot/subslot after the delay) may be limited to a UL slot or subslot that may be indicated or configured by a value different from K1 values available to the UE (i.e., K1 values given by scheduling information regarding a corresponding PDSCH). For example, Implementation A1 or B1 may be used. Accordingly, the UE may multiplex HARQ-ACK information of the delayed PUCCH and HARQ-ACK information of another PUCCH while using a conventional HARQ-ACK codebook determination method. When a PDSCH is received in slot n-kl and a PUCCH is instructed to be transmitted in slot n in response to the PDSCH, if another PUCCH slot is no longer indicated for the same PDSCH, Option 1 may be useful.

Option 2: HARQ-ACK information transferred over a delayed PUCCH and non-delayed HARQ-ACK information may be configured with different HARQ-ACK codebooks. In other words, a HARQ-ACK codebook supposed to be transferred on the delayed PUCCH and a HARQ-ACK codebook supposed to be transferred on a non-delayed PUCCH may be configured separately, and the HARQ-ACK codebooks may be concatenated and then transmitted over one PUCCH, which is determined based on the delayed PUCCH and non-delayed PUCCH. For example, two HARQ-ACK codebooks each configured according to different rules may be concatenated and transmitted on one PUCCH. In some implementations, for the HARQ-ACK information transmitted on the non-delayed PUCCH, the HARQ-ACK codebook may be determined in a conventional manner. In some implementations, the different HARQ-ACK codebooks may be configured according to at least one of the methods described in Implementation A4/B4.

Option 3: When the interval between a slot/subslot to which a HARQ-ACK PUCCH is delayed (i.e., slot/subslot after the delay) and a (UL) slot in which an associated PDSCH is received is capable of being represented as one of K1 values configured by the BS to the UE (to configure a codebook for use), information in the corresponding HARQ-ACK PUCCH may be expressed as part of a HARQ-ACK codebook configured for transmission of a non-delayed PUCCH as in Option 1. Other HARQ-ACK PUCCHs may be multiplexed together according to one of the methods described above in Option 2.

Option 4: The UE may expect that a delayed HARQ-ACK PUCCH does not overlap in time with other PUCCHs. If the delayed HARQ-ACK PUCCH overlaps in time with the other PUCCHs, the UE may not transmit the delayed HARQ-ACK PUCCH. Option 4 may be used to opportunistically support the delayed HARQ-ACK PUCCH while minimizing the impact of the delayed HARQ-ACK PUCCH on other transmissions.

<Implementation A2-1> How to Construct Delayed HARQ-ACK Codebook with Fallback HARQ-ACK Codebook In particular, when the UE uses a different codebook in response to a predetermined PDSCH or SPS release, Option 3 described above in Implementation A2 may be embodied as follows. For example, when the UE transmits only a HARQ-ACK response for i) an SPS PDSCH release indicated by DCI format 1_0 with a counter DAI field value of 1; ii) a PDSCH reception scheduled by DCI format 1_0 with a counter DAI field value of 1 on the PCell; or iii) SPS PDSCH reception(s), over one PUCCH, the UE may use a separate HARQ-ACK codebook (hereinafter, a fallback HARQ-ACK codebook) configured only for the above response, instead of using the normal Type-1 HARQ-ACK codebook specified in Sections 9.1.2.1 and 9.1.2.2 of 3GPP TS 38.213. If the fallback HARQ-ACK codebook is used for a specific PUCCH, PUCCH x or group X of PUCCHs, and if delayed HARQ-ACK PUCCH Y overlaps in time with PUCCH x or PUCCH group X, the following UE operations may be considered based on Option 3 described in Implementation A2.

Method 1: When the interval between a slot/subslot to which HARQ-ACK PUCCH Y is delayed and a (UL) slot in which an associated PDSCH is received is capable of being represented as one of K1 values configured by the BS to the UE (together with a PUCCH resource configuration), information in the corresponding HARQ-ACK PUCCH may be expressed as part of the normal Type-1 HARQ-ACK codebook configured for transmission of one or a plurality of non-delayed PUCCHs as in Option 1 described in Implementation A1. For other HARQ-ACK PUCCHs Y, HARQ-ACK information in PUCCH x or PUCCH group X may be configured as the fallback HARQ-ACK codebook based on the idea described above in Option 2, and HARQ-ACK information in PUCCH Y may be configured according to at least one of the methods described in Implementation A4/B4. To multiplex the HARQ-ACK information of PUCCH x or PUCCH group X and the HARQ-ACK information of PUCCH Y, the UE may concatenate and transmit the two types of HARQ-ACK information configured in different ways.

<Implementation A3> How to Construct Type-2 Delayed HARQ-ACK Codebook

When the UE delays a indicated or configured PUCCH transmission to a later symbol/subslot/slot different from a symbol/subslot/slot, which is based on indicated or configured scheduling information, and when the delayed PUCCH transmission overlaps in time with another PUCCH transmission, the UE may multiplex HARQ-ACK information to be transmitted on overlapping PUCCHs onto a Type-2 HARQ-ACK codebook according to the following methods. The Type-2 HARQ-ACK codebook is a HARQ-ACK codebook in which the HARQ-ACK payload size varies according to dynamic scheduling information. For example, HARQ-ACK information generated by the HARQ-ACK codebook determination method defined in Section 9.1.3 of 3GPP TS 38.213 may be the Type-2 HARQ-ACK codebook.

Option 1: HARQ-ACK information transferred over a delayed PUCCH and non-delayed HARQ-ACK information may be configured with different HARQ-ACK codebooks. In some implementations, the different HARQ-ACK codebooks may be configured according to at least one of the methods described in Implementation A4/B4. In some implementations, for the HARQ-ACK information transferred on the non-delayed PUCCH, a HARQ-ACK codebook may be determined in a conventional manner.

Option 2: When a delayed PUCCH is a PUCCH for transmitting a HARQ-ACK for an SPS PDSCH, a separate HARQ-ACK codebook for SPS PDSCH reception may be configured for the Type-2 HARQ-ACK codebook, and delayed SPS PDSCH reception and non-delayed (i.e., normal) SPS HARQ-ACK reception may be multiplexed onto one codebook as follows.

Option 2-1: A HARQ-ACK codebook may be configured by connecting HARQ-ACK bits associated with SPS PDSCHs in the following order: SPS configuration index→DL slot index→PDSCH starting symbol. For example, the HARQ-ACK codebook may be configured as follows: all HARQ-ACK bits respectively associated with SPS PDSCH occasions are arranged in order of SPS configuration indices; when multiple PDSCHs are associated with one SPS configuration index, the HARQ-ACK bits are arranged in order of the indices of DL slots in which the PDSCHs are received; and when a plurality of PDSCHs are received in one DL slot, the HARQ-ACK bits are arranged in order of the starting symbols of each PDSCH occasion.

Option 2-2: A HARQ-ACK codebook may be configured by connecting HARQ-ACK bits associated with SPS PDSCHs in the following order: SPS configuration index→DL slot index→{normal, delayed}. For example, the HARQ-ACK codebook may be configured as follows: all HARQ-ACK bits respectively associated with SPS PDSCH occasions are arranged in order of SPS configuration indices; when multiple PDSCHs are associated with one SPS configuration index, the HARQ-ACK bits are arranged in order of the indices of DL slots in which the PDSCHs are received; and when a plurality of PDSCHs are received in one DL slot, the HARQ-ACK bits are arranged in order of the starting symbols of PDSCHs associated with normal HARQ-ACKs and then arranged in order of the starting symbols of PDSCHs associated with delayed HARQ-ACKs.

Option 2-3: A HARQ-ACK codebook may be configured by connecting HARQ-ACK bits associated with SPS PDSCHs in the following order: SPS configuration index→{DL slot index for normal HARQ-ACK, DL slot index for delayed HARQ-ACK}. For example, the HARQ-ACK codebook may be configured as follows: all HARQ-ACK bits respectively associated with SPS PDSCH occasions are arranged in order of SPS configuration indices; and when multiple PDSCHs are associated with one SPS configuration index, the HARQ-ACK bits are first arranged in order of the indices of DL slots in which PDSCHs associated with normal HARQ-ACKs are received and then arranged in order of the indices of DL slots in which PDSCHs associated with delayed HARQ-ACKs are received. As another example, when a plurality of SPS PDSCHs associated with one SPS configuration are capable of being received in one DL slot, that is, when there are a plurality of SPS PDSCH occasions associated with one SPS configuration in one DL slot, if PDSCH occasions in a specific DL slot are considered with reference to the indices of DL slots in which PDSCHs associated with normal HARQ-ACKs are received, the HARQ-ACK bits may be placed in the HARQ-ACK codebook in order of the starting symbols of each PDSCH by considering only the PDSCHs associated with the normal HARQ-ACKs within the corresponding slot. If the PDSCH occasions in the specific DL slot are considered with reference to the indices of DL slots in which PDSCHs associated with delayed HARQ-ACKs are received, the HARQ-ACK bits may be placed in the HARQ-ACK codebook in order of the starting symbols of each PDSCH by considering only the PDSCHs associated with the delayed HARQ-ACKs.

Option 2-4: One codebook may be configured by concatenating a HARQ-ACK codebook, which is configured by connecting HARQ-ACK bits associated with SPS PDSCHs in the following order: SPS configuration index→DL slot index for normal HARQ-ACK, and a HARQ-ACK codebook, which is configured by connecting the HARQ-ACK bits associated with the SPS PDSCHs in the following order: SPS configuration index→DL slot index for delayed HARQ-ACK. For example, when HARQ-ACK bits respectively associated with SPS PDSCHs may include normal HARQ-ACK bits and delayed HARQ-ACK bits, the UE may configure a HARQ-ACK codebook as follows: the normal HARQ-ACK bits are collected in order of SPS configuration indices; and when multiple normal HARQ-ACK bits are associated with one SPS configuration index, the normal HARQ-ACK bits are collected in order of the indices of DL slots in which the associated PDSCHs are received. In addition, the UE may configure another HARQ-ACK codebook as follows: the delayed HARQ-ACK bits are collected in order of SPS configuration indices; and when multiple delayed HARQ-ACK bits are associated with one SPS configuration index, the delayed HARQ-ACK bits are collected in order of the indices of DL slots in which the associated PDSCHs are received. Then, the UE may configure one HARQ-ACK codebook by concatenating the two HARQ-ACK codebooks. As another example, when a plurality of SPS PDSCHs associated with one SPS configuration are capable of being received in one DL slot, HARQ-ACK bits may be placed in a HARQ-ACK codebook in order of the starting symbols of each PDSCH by considering only PDSCHs associated with normal HARQ-ACKs within the corresponding slot if PDSCH occasions in a specific DL slot are considered with reference to the indices of DL slots in which the PDSCHs associated with the normal HARQ-ACKs are received. In addition, HARQ-ACK bits may be placed in a HARQ-ACK codebook in order of the starting symbols of each PDSCH by considering only PDSCHs associated with delayed HARQ-ACKs if PDSCH occasions in a specific DL slot are considered with reference to the indices of DL slots in which the PDSCHs associated with the delayed HARQ-ACKs are received.

<Implementation A4> Separate HARQ-ACK Codebook for Delayed HARQ-ACK Codebook (Separated HARQ-ACK Codebook for Delayed HARQ-ACK Codebook)

To multiplex HARQ-ACK information transferred over a delayed PUCCH and non-delayed HARQ-ACK information, the UE may configure a separate HARQ-ACK codebook only based on the HARQ-ACK information transferred over the delayed PUCCH. If the non-delayed HARQ-ACK information is present in a slot to which the HARQ-ACK information is delayed, the UE may configure a single HARQ-ACK UCI by appending a UCI configured with a delayed HARQ-ACK codebook to the non-delayed HARQ-ACK information. In this case, the following methods may be used.

Method 1: To configure a HARQ-ACK codebook for HARQ-ACK information transferred on a delayed PUCCH, a separate K1 set available for transmission of the delayed PUCCH may be configured. The delayed HARQ-ACK codebook may be configured based on the separately configured K1 set in the same way when a HARQ-ACK codebook for non-delayed HARQ-ACK information is configured.

Method 2: Considering that a PUCCH is delayed to a next available PUCCH, symbol(s), subslot, and/or slot, the UE may derive a set of slots/subslots in which PUCCH transmission may be cancelled and then configure a codebook for the canceled PUCCHs based on the set of slots/subslots in order to configure a separate HARQ-ACK codebook for delayed PUCCHs. For example, the UE may consider a subslot or slot having PUCCH resources overlapping with DL symbols among configured PUCCH resources. That is, among M*N PUCCHs, which are obtained by combining M configured PUCCH resource sets and N PUCCH resources configured for each PUCCH resource set, the UE may derive a set of PUCCHs overlapping with DL symbols in a corresponding UL slot or subslot. Then, the UE may derive the set of PUCCHs for each UL slot. For each UL slot where the corresponding PUCCH transmission may be delayed to another slot or subslot, the UE may configure a HARQ-ACK codebook by concatenating UCIs to be transmitted on delayed PUCCHs in order of the PUCCH resource sets. For one PUCCH resource set, the UE may configure a HARQ-ACK codebook by concatenating the UCIs to be transmitted on the delayed PUCCHs in order of PUCCH resource IDs. HARQ-ACK codebooks configured for each UL slot may be concatenated in order of UL slots.

Method 3: When a PUCCH for SPS PDSCHs is delayed, a HARQ-ACK codebook may be configured in the same way when only SPS HARQ-ACKs are transmitted. In this case, the HARQ-ACK codebook for the delayed PUCCH may be configured according to the method(s) described in Implementation A3.

Method 4: When a PUCCH for SPS PDSCHs is delayed, a HARQ-ACK codebook may be configured only for SPS PDSCHs for which HARQ-ACK transmission is delayed. In this case, the HARQ-ACK codebook for the delayed PUCCH may be configured according to the following methods, which are part of the methods described in Implementation A4. For example, for HARQ-ACK bits respectively associated with SPS PDSCH occasions, the UE may configure one HARQ-ACK codebook by collecting HARQ-ACK bit(s) for PDSCH(s) associated with delayed HARQ-ACK(s) received in each DL slot as follows: in order of SPS configuration indices; and in order of the indices of DL slots in which PDSCHs associated with delayed HARQ-ACKs are received when multiple PDSCHs are associated with one SPS configuration index.

Method 5: When a PUCCH (e.g., PUCCH for SPS HARQ-ACK, PUCCH for periodic CSI, PUCCH for SR, etc.) whose transmission is semi-statically configured is delayed, only a slot in which the configured PUCCH is canceled may be considered in order to configure a HARQ-ACK codebook for the delayed PUCCH. For example, the UE may consider PUCCH occasions in a subslot or slot having transmissions canceled due to overlapping with DL symbols among configured PUCCH transmissions. The UE may arrange PUCCH transmissions canceled due to overlapping with the semi-statically configured DL symbols among the configured PUCCH transmissions as follows: in order of slots; and in order of SPS configuration indices, PUCCH resource IDs, and/or starting symbols for each slot (if present). Then, the UE may configure a separate HARQ-ACK codebook by collecting (i.e., connecting) HARQ-ACK information related to each PUCCH occasion in the above order.

<Implementation A5> Timeline Between Delayed HARQ-ACK PUCCH and Other PUCCH Transmissions When the UE is incapable of using an indicated or configured HARQ-ACK PUCCH resource for transmission due to an indication through L1 signaling from the BS and/or a configuration through higher layer signaling from the BS, the UE may delay transmission of a corresponding PUCCH. If UL multiplexing is required because delayed PUCCH transmission X overlaps in time with group Y of PUCCHs and/or PUSCHs, it may be necessary to check the timeline of overlapping UL channels again due to the delayed PUCCH. For example, the following two cases may occur.

Case 1: A case in which the last symbol of any PDSCH/ PDCCH associated with delayed PUCCH transmission X (e.g., causing corresponding UL transmission) is later than the last symbol of any PDSCH/PDCCH associated with group Y of PUCCHs and/or PUSCHs (e.g., causing corresponding UL transmission).

Case 2: A case in which the starting symbol of delayed PUCCH transmission X is earlier than the earliest starting symbol of group Y of PUCCHs and/or PUSCHs.

When the above two cases occur, if UL multiplexing is performed on delayed PUCCH transmission X and group Y of PUCCHs and PUSCHs, the multiplexing timeline requirement specified in Section 9.2.5 of 3GPP TS 38.213 may not be satisfied. If the multiplexing timeline requirement is not satisfied due to the delayed PUCCH transmission, at least one of the following methods may be considered.

Method 1: The UE may multiplex only group Y of PUCCHs and/or PUSCHs to transmit it, without transmitting the delayed PUCCH (i.e., dropping transmission of UCI that was supposed to be carried by the delayed PUCCH). This is to minimize the effect of the delayed PUCCH transmission on other previously indicated/configured UL transmissions. Method 1 may be limited to the case where delayed PUCCH transmission X and group Y of PUCCHs and PUSCHs have the same priority index.

Method 2: The UE may transmit only the delayed PUCCH without transmitting group Y of PUCCHs and/or PUSCHs. This is to prioritize the delayed PUCCH transmission over other transmissions by allowing the delayed PUCCH only for a PDSCH over which the BS transmits important traffic. Method 2 may be limited to the case where delayed PUCCH transmission X has a higher priority index than group Y of PUCCHs and/or PUSCHs.

Method 3: The UE may delay delayed PUCCH transmission X once more. In this case, the method(s) described in Implementation A1/B1 may be used. When the method(s) described in Implementation A1/B1 are used, the method(s) may be applied on the assumption that the time interval between PDSCH and PUCCH transmissions and the value of K1, which vary due to the delayed PUCCH, are the same as initially indicated values.

Method 4: The UE may delay group Y of PUCCHs and/or PUSCHs. In this case, the method(s) described in Implementation A1/B1 may be used. Method 4 may be limited to UL transmission in which group Y of PUCCHs and/or PUSCHs are semi-statically configured to be transmitted.

Method 5: The UE may not transmit both the delayed PUCCH and group Y of PUCCHs and/or PUSCHs and may drop UCI associated therewith. Method 5 may be used to alleviate the implementation complexity of the UE.

<Implementation A6> Avoiding Out-of-Order Due to Delayed HARQ-ACK

When the UE delays PUCCH transmission, the UE may need to consider processes for decoding other PDSCHs. To maintain the implementation complexity of the UE below a prescribed level, the UE may configure a pipeline of reception procedures by performing each process necessary for PDSCH reception sequentially for each PDSCH. In this case, an operation for the UE to always transmit a HARQ-ACK for a PDSCH received first before a HARQ-ACK for a PDSCH received later or an operation for the UE not to receive other PDSCHs before PUCCH transmission for the same HARQ process needs to be considered.

As one example, the UE is not expected to receive another PDSCH for a given HARQ process until after the end of the expected transmission of HARQ-ACK for the HARQ process. The transmission timing of a HARQ-ACK PUCCH for a PDSCH based on a prescribed HARQ process is given by Section 9.2.3 of 3GPP TS 38.213.

As another example, in a given scheduled cell, the UE is not expected to perform a first PDSCH reception and a second PDSCH reception, starting later than the first PDSCH reception, with its corresponding HARQ-ACK transmission assigned to be performed on a resource ending before the start of a different resource assigned for a HARQ-ACK transmission for the first PDSCH reception, where the two resources are in different slots for the associated HARQ-ACK transmissions, each slot is composed of $N^{slot}_{symb}$ symbols or symbols indicated by subslotLengthForPUCCH-r16 if provided, and the HARQ-ACKs for the two PDSCHs are associated with a HARQ-ACK codebook of the same priority.

As another example, in a given scheduled cell, if HARQ-ACK transmissions for a first PDSCH reception and a second PDSCH reception are associated with HARQ-ACK codebooks of different priorities, the UE is not expected to perform the first PDSCH reception and the second PDSCH reception, starting later than the first PDSCH reception, with its corresponding HARQ-ACK transmission assigned to be performed on a resource ending before the start of a different resource assigned for the HARQ-ACK transmission for the first PDSCH reception.

As a further example, for any two HARQ process IDs in a scheduled cell, if the UE is scheduled to start receiving a first PDSCH (for a first HARQ process ID) starting in symbol j by a PDCCH ending in symbol i, the UE is not expected to be scheduled to receive a PDSCH (for a second HARQ process ID) starting earlier than the end of the first PDSCH with a PDCCH that ends later than symbol i.

If the UE delays a PUCCH for a first PDSCH received first, during the procedure of delaying PUCCH transmission, the starting and ending symbols of the corresponding PUCCH may vary. In this case, the starting symbol of the delayed PUCCH may be delayed after the ending symbol of a HARQ-ACK PUCCH for a second PDSCH received later than an associated PDSCH, or the ending symbol of the delayed PUCCH may be delayed after the starting symbol of another SPS PDSCH occasion associated with the same HARQ process. According to the UE operation(s) described above, part of PDSCH allocation may not be received, which may act as an additional burden and scheduling restriction to the BS.

To solve this problem, the following UE operations may be additionally considered for a delayed PUCCH in consideration of a series of UE operation(s) described above.

Method 1: When the UE delays PUCCH transmission A to transmit it in a UL symbol/subslot/slot later than a previously indicated or configured UL symbol/subslot/slot, if the starting symbol of the delayed PUCCH is delayed after the ending symbol of a HARQ-ACK PUCCH for another PDSCH received later than an associated PDSCH, or if the ending symbol of the delayed PUCCH is delayed after the starting symbol of another SPS PDSCH occasion associated with the same HARQ process, the UE may drop HARQ-ACK transmission without performing (by cancelling) the corresponding PUCCH transmission. That is, the starting symbol of the delayed PUCCH is delayed after the ending symbol of the HARQ-ACK PUCCH for the other PDSCH received later than the associated PDSCH, or if the ending symbol of the delayed PUCCH is delayed after the starting symbol of another SPS PDSCH occasion associated with the same HARQ process, the UE may transmit the HARQ-ACK PUCCH for the other PDSCH received later. Alternatively, the UE may perform SPS PDSCH reception on the other SPS PDSCH occasion and drop the delayed HARQ-ACK transmission. Alternatively, to achieve the same effect, when the UE delays PUCCH transmission, the UE may assume that the ending symbol of a HARQ-ACK PUCCH for another PDSCH received later and the starting symbol of another SPS PDSCH occasion associated with the same HARQ process are the maximum delay time points of the starting and ending symbol of the delayed PUCCH. In some implementations, the operation may be limited to the case where another PDSCH received later than a PDSCH associated with PUCCH transmission A is dynamically indicated. In some implementations for Method 1, the starting or ending symbol of the delayed PUCCH may be the starting or ending symbol of a PUCCH (i.e., MUX PUCCH) that considers other PUCCHs scheduled to be transmitted in a corresponding UL symbol/subslot/slot. Alternatively, considering the possibility of DCI missing, the starting or ending symbol of the delayed PUCCH may be the starting or ending symbol of a PUCCH (i.e., PUCCH before consideration of multiplexing) that does not consider other PUCCHs scheduled to be transmitted in a corresponding UL symbol/subslot/slot (i.e., PUCCH before multiplexing is considered).

Figure 16:
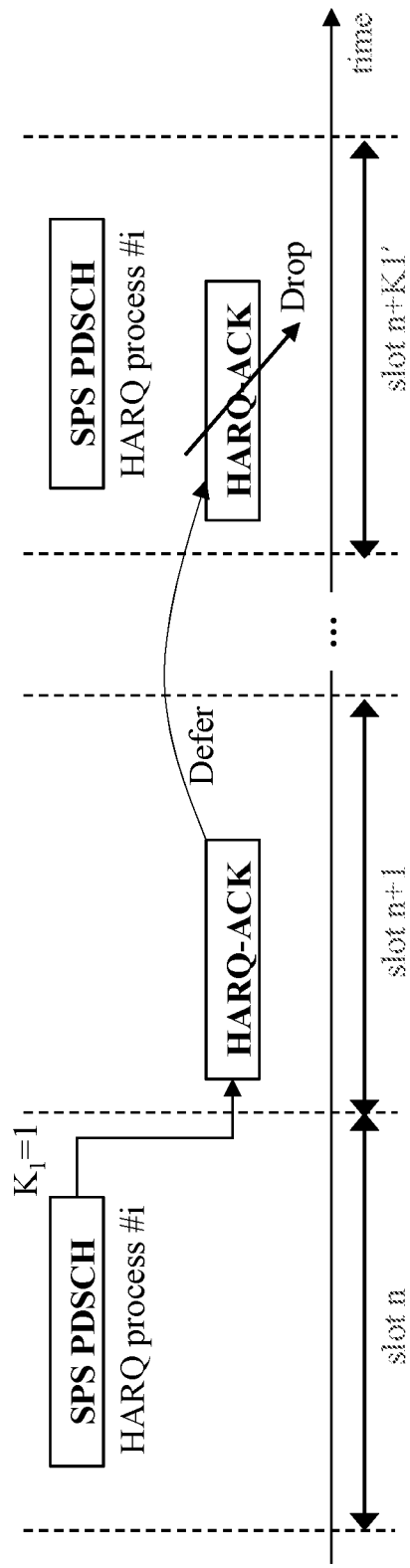
FIG. 16 illustrates channel transmission/reception according to some implementations of the present disclosure.

FIG. 16 illustrates channel transmission/reception according to some implementations of the present disclosure. Referring to FIG. 16, even though an SPS PDSCH in slot n uses HARQ process #i, and HARQ-ACK transmission for the SPS PDSCH is scheduled in slot n+1, the UE may determine to delay a PUCCH in slot n+1 for the HARQ-ACK transmission for the SPS PDSCH to slot n+K1' based on a predetermined condition. However, as illustrated in FIG. 16, when the end of the PUCCH for the HARQ-ACK transmission delayed to slot n+K1' is later than the start of another SPS PDSCH using the HARQ process #i (for example, when the delayed PUCCH overlaps in time with the other PDSCH using the same HARQ process, HARQ process #i), the UE may drop the delayed HARQ-ACK transmission and receive the other PDSCH.

The reason for using Method 1 is as follows. Delaying a PUCCH is transmitting, at a different timing, the PUCCH of which transmission at the original timing is canceled because it is difficult to transmit the PUCCH at the original timing, in order to reduce cancelation of HARQ-ACK transmissions. If another PUCCH for the same HARQ process ID is canceled by a PUCCH canceled due to delaying the PUCCH, the number of times that HARQ-ACK transmission is cancelled may not be reduced. Thus, there is no need to delay the PUCCH. In addition, for URLLC, the valid period of data transmitted on a PDSCH may be short. Thus, receiving the later PDSCH may increase the probability of receiving valid data at the UE. On the other hand, if there is a PUCCH scheduled to be transmitted at the transmission timing for an SPS HARQ-ACK before the delay, the SPS HARQ-ACK may be transmitted on a PUCCH scheduled by DCI. Thus, the operations of delaying the SPS HARQ-ACK may or may not be performed according to a result of receiving dynamic scheduling DCI. Therefore, if the delayed PUCCH is transmitted, and an SPS PDSCH is not received later, there may be ambiguity between the UE and BS because whether the UE is to receive the SPS PDSCH depends on whether the UE successfully receives DCI. However, according to Method 1, these problems may be prevented.

Method 2: When the UE delays PUCCH transmission, if the starting symbol of a delayed PUCCH is capable of being delayed after the ending symbol of a HARQ-ACK PUCCH for another PDSCH received later than a corresponding PDSCH, the UE may delay or multiplex the HARQ-ACK PUCCH for the other PDSCH received later. Compared to Method 1, Method 2 may increase the implementation complexity of the UE but may transmit HARQ-ACK information to the BS as much as possible.

Method 2-1: The UE may delay PUCCH transmission A to the first PUCCH in time, among HARQ-ACK PUCCH(s) for other PDSCH(s) received later than a PDSCH associated with the delayed PUCCH.

Method 2-2: The UE may multiplex UCI (e.g., HARQ-ACK bits) transferred on PUCCH transmission A with the first PUCCH in time, among HARQ-ACK PUCCH(s) for other PDSCH(s) received later than a PDSCH associated with the delayed PUCCH.

Method 2-3: The UE may delay a HARQ-ACK PUCCH for another PDSCH received later than a PDSCH associated with the delayed PUCCH. In this case, the HARQ-ACK PUCCH for the other PDSCH may be delayed to a resource of the delayed PUCCH. For example, when PDSCH #2 and PDSCH #3 are received later than PDSCH #1 associated with delayed PUCCH #1, HARQ-ACK PUCCH #2 for PDSCH #2 and HARQ-ACK PUCCH #3 for PDSCH #3 may be delayed to a resource of delayed PUCCH #1, which is transmitted later than HARQ-ACK PUCCH #2 and HARQ-ACK PUCCH #3.

Method 2-4: The UE may multiplex UCI (e.g., HARQ-ACK bits) transmitted on a HARQ-ACK PUCCH for another PDSCH received later than a PDSCH associated with a delayed PUCCH with PUCCH transmission A.

<Implementation A7> How to Combine Delayed SPS HARQ-ACK Codebooks and Other Codebooks When Implementations A1/A2/A3/A4 of the present disclosure are used in combination, a single UCI may be configured by combining one or more delayed SPS HARQ-ACK codebooks and HARQ-ACK transmission scheduled in slots for delay as follows.

When the UE delays and transmits a codebook including SPS HARQ-ACK(s), delayed HARQ-ACK information may be limited to HARQ-ACKs for SPS PDSCH receptions. In this case, each of the delayed HARQ-ACK codebooks may be configured as a separate HARQ-ACK codebook including only HARQ-ACK response(s) for SPS PDSCH receptions(s) as described in Implementation A2-1. For example, each delayed HARQ-ACK codebook may be configured according to the following method, which is specified in Section 9.1.2 of 3GPP TS 38.213.

If a UE reports HARQ-ACK information in a PUCCH only for i) a SPS PDSCH release indicated by DCI format 1_0 with counter DAI field value of 1, or ii) a PDSCH reception scheduled by DCI format 1_0 with counter DAI field value of 1 on the PCell, or iii) SPS PDSCH reception(s), within $M_{A,c}$ occasions for candidate PDSCH receptions as determined 9.1.2.1 of 3GPP TS 38.213, the UE determines a HARQ-ACK codebook only for the SPS PDSCH release, or only for the PDSCH reception, or only for a SPS PDSCH reception, according to corresponding $M_{A,c}$ occasions on respective serving cells, where the value of counter DAI in DCI format 1_0 is according to Table 9.1.3-1 of 3GPP TS 38.213 and HARQ-ACK information bits in response to more than one SPS PDSCH receptions that the UE is configured to receive are ordered according to the following pseudo-code; otherwise, the procedures in sections 9.1.2.1 and 9.1.2.2 of 3GPP TS 38.213.

slots. Thus, the UE may first decode the first delayed HARQ-ACK codebook. When the delayed HARQ-ACK codebooks are concatenated in reverse order of the slots, if the HARQ-ACK codebooks are appended to non-delayed SPS HARQ-ACKs in slots for delay, the HARQ-ACK codebooks may be arranged in the final HARQ-ACK UCI in the reverse order of UL slots. Thus, it may be easy to configure the HARQ-ACK codebooks at once based on one pseudo-code.

```
> Set N^DL_cells to the number of serving cells configured to the UE
> Set N^SPS_c to the number of SPS PDSCH configuration configured to the UE for serving
cell c
> Set N^DL_c to the number of DL slots for SPS PDSCH reception on serving cell c with
HARQ-ACK information multiplexed on the PUCCH
> Set j = 0 - HARQ-ACK information bit index
> Set c = 0 - serving cell index; lower indexes correspond to lower RRC indexes of
corresponding cell
>> while c < N^DL_cells
>> Set s = 0 - SPS PDSCH configuration index; lower indexes correspond to lower RRC
indexes of corresponding SPS configurations
>>> while c < N^SPS_c
>>>> Set n_D = 0 - slot index
>>>>> while n_D < N^DL_c
>>>>>> if {
a UE is configured to receive SPS PDSCHs from n_D - N^repeat_PDSCH + 1 to slot n_D for SPS
PDSCH configuration s on serving cell c, excluding SPS PDSCHs that are not required to be
received in any slot among overlapping SPS PDSCHs, if any according to 3GPP TS 38.214, or
based on a UE capability for a number of PDSCH receptions in a slot according to 3GPP TS
38.214, or due to overlapping with a set of symbols indicated as uplink by tdd-UL-DL-
ConfigurationCommon or by tdd-UL-DL-ConfigurationDedicated where N^repeat_PDSCH is provided
by pdsch-AggregationFactor-r16 in sps-Config or, if pdsch-AggregationFactor-r16 is not
included in sps-Config, by pdsch-AggregationFactor in pdsch-config, and
HARQ-ACK information for the SPS PDSCH is associated with the PUCCH
}
O^ACK_j = HARQ-ACK information bit for this SPS PDSCH reception
j = j + 1;
end if
n_D = n_D + 1;
end while
s = s + 1;
end while
c = c + 1;
end while.
```

When the UE delays and transmits PUCCH a or group A of PUCCHs including a HARQ-ACK for an SPS PDSCH (hereinafter referred to as an SPS HARQ-ACK) to and in slot T, the UE may configure a single HARQ-ACK UCI by concatenating delayed HARQ-ACK codebooks in the chronological order of initial slots before the delay in order to configure a HARQ-ACK codebook based only on HARQ-ACK information transferred on delayed PUCCHs, as described in Implementation A4. For example, when the UE delays and transmits N PUCCHs to and in slots $T_1$, $T_2, \ldots, T_{N-1}$ (where if n<m, $T_n<T_m$), respectively, the UE may configure HARQ-ACK UCI of $\{H_1, H_2, \ldots, H_{N-1}\}$ by concatenating N HARQ-ACK codebooks of $H_1, H_2, \ldots, H_{N-1}$ consisting of SPS HARQ-ACKs scheduled in slots in order of the slots. Alternatively, the UE may configure HARQ-ACK UCI of $\{H_{N-1}, H_{N-2}, \ldots, H_1\}$ by concatenating the N HARQ-ACK codebooks in reverse order of the slots.

If non-delayed HARQ-ACK information is scheduled in slot T, the UE may configure a single HARQ-ACK UCI by appending UCIs configured with delayed HARQ-ACK codebooks to the non-delayed HARQ-ACK information.

When delayed HARQ-ACK codebooks are concatenated in order of slots, a first delayed HARQ-ACK codebook may be included in preceding bits of the final HARQ-ACK UCI, compared to HARQ-ACK codebooks delayed to later UL BS Side:

The above implementations of the present disclosure will be described again from the perspective of the BS.

Figure 17:
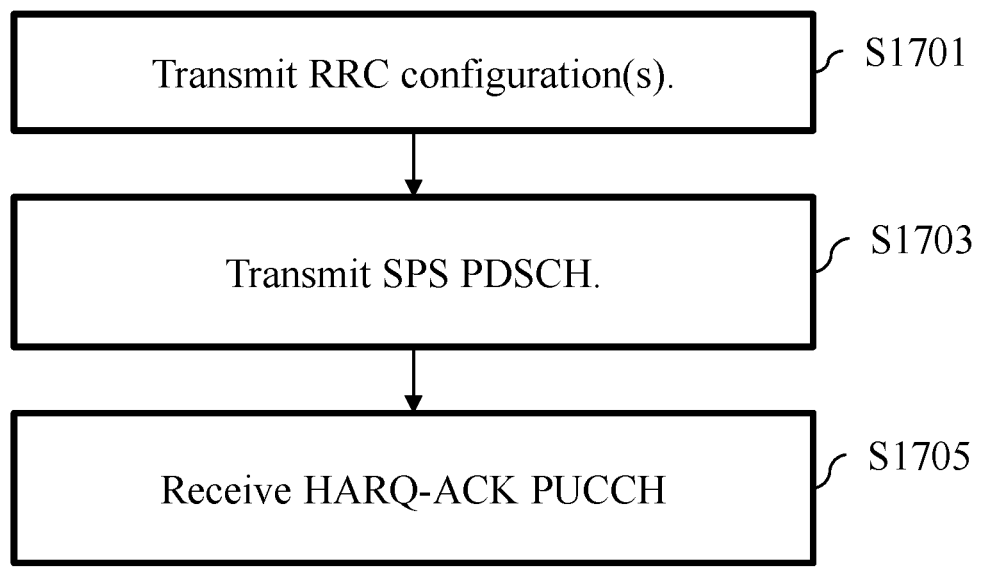
FIG. 17 illustrates a flow of UL channel reception at a BS according to some implementations of the present disclosure.

FIG. 17 illustrates a flow of UL channel reception at a BS according to some implementations of the present disclosure.

The BS may provide to the UE higher layer (e.g., RRC) parameters for configuring PUCCH transmissions and slot formats. The BS may transmit a PDSCH to the UE by scheduling the PDSCH in DCI or configuring an SPS PDSCH through higher layer (e.g., RRC) configurations and SPS activation DCI. Then, the BS may receive a PUCCH in response to the PDSCH. In some implementations, the BS may delay some PUCCH receptions among PUCCH receptions based on a slot format indicated/configured to the UE. In addition, the BS may assume that the delayed PUCCH receptions and another PUCCH reception may be multiplexed by the UE. For example, in some implementations of the present disclosure, the BS may operate as follows.

The BS may transmit to the UE one or more RRC configurations for SPS PDSCH reception and PUCCH transmission at the UE (S1701). In some implementations, the RRC configurations may be provided separately for each SPS PDSCH configuration.

The BS may transmit an SPS PDSCH activation indication to the UE. The BS may transmit an SPS PDSCH to the UE based on the SPS PDSCH activation indication and the RRC configuration for SPS PDSCH transmission (S1703).

The BS may receive a HARQ-ACK PUCCH for the SPS PDSCH, which is received by the UE, based on the SPS PDSCH activation indication and the RRC configuration for PUCCH reception (S1705). If a configured HARQ-ACK PUCCH resource is not available for the transmission at the UE due to an indication through L1 signaling from the BS and/or a configuration through higher layer signaling from the BS, the BS may assume that the UE will delay the PUCCH transmission. For example, the BS may attempt to receive a PUCCH or UCI from the UE by assuming that the UE delays transmission of the PUCCH or UCI to the following resources:

Next available UL symbol/slot/subslot,
Next PUCCH scheduled via DCI,
Next PUCCH resource configured for same or different SPS PDSCH configurations, or
Slot/subslot mapped to next K1 value or K1 value configured for delaying.

According to some implementations of the present disclosure, if a delayed PUCCH overlaps in time with another PUCCH reception, the BS may receive the PUCCHs and also successfully receive UCIs multiplexed on the PUCCHs according to the following method(s), which will be described below.

In some implementations of the present disclosure, the following BS operation(s) may be considered.

<Implementation B1> Delaying HARQ-ACK to Next K1 Value

The UE may transmit a HARQ-ACK PUCCH for a received PDSCH based on DL scheduling information from the BS and an RRC configuration (e.g., an IE PUCCH-config) related to PUCCH transmission. If a configured HARQ-ACK PUCCH resource is not available for the transmission due to an indication through L1 signaling (e.g., PDCCH) from the BS and/or a configuration through higher layer (e.g., RRC) signaling from the BS, the UE may delay the PUCCH transmission. In this case, the BS may attempt to receive the corresponding PUCCH by assuming that the UE may delay the PUCCH transmission as follows.

When the BS schedules a PDSCH, the BS may indicate or configure a slot or subslot interval K1 from the end of the PDSCH to PUCCH transmission associated with the PDSCH. To this end, the BS may configure a set of K1 values through a higher layer (RRC) parameter (e.g., dl-DataToUL-ACK) to inform the UE of a slot or subslot for transmitting the PUCCH after PDSCH reception. The BS may indicate one value in the set of K1 values to the UE through a PDSCH-to-HARQ_ACK timing indicator field included in DCI. For example, if the set of K1 values is given as $\{X_1, X_2, X_3, \ldots, X_N\}$, and if the PUCCH transmission for the PDSCH for which $X_a$ is indicated as the K1 value needs to be delayed, a PUCCH resource, which is to be used when $X_{a+1}$ is indicated for the PDSCH, may be used for the PUCCH transmission.

Alternatively, a PUCCH resource, which is to be used when $X_b$ is indicated as the K1 value for the PDSCH, may be used for the delayed PUCCH transmission. In this case, b has a value greater than a, which may be the first index among K1 indices that indicate slots or subslots in which indicated PUCCH resources do not overlap with DL symbols.

Alternatively, a subset of K1 values to be used for the delayed PUCCH transmission may be preconfigured. For example, when the subset is $\{X'_1, X'_2, X'_3, \ldots, X'_N\}$, if $X'_a$ one element of the subset is indicated as the K1 value while the corresponding PDSCH is scheduled, a PUCCH resource to be used when $X'_{a+1}$ is indicated as the K1 value may be used for the delayed PUCCH transmission.

When there are no available K1 values within a given K1 set or subset, or when an initially given K1 value is the largest value in the K1 set, the BS may assume that the UE cancels the PUCCH transmission.

When the length of a maximum time delay T is configured by L1 signaling or higher layer (RRC) signaling from the BS, and when the UE uses $X_B$ to support the PUCCH, instead of using $X_A$, which is indicated as the K1 value, $X_B$ may be limited to satisfy the following relationship: $X_B - X_A < T$.

<Implementation B1-1> Maximum Delay Allowed for PUCCH (Maximally Allowed Delay for PUCCH)

When a configured HARQ-ACK PUCCH resource is not available for transmission due to an indication through L1 signaling from the BS and/or a configuration through higher layer (e.g., RRC) signaling from the BS, the BS may attempt to receive a PUCCH from the UE by assuming that the UE delays the PUCCH transmission. In this case, the length of a maximum time delay T may be defined as follows.

T may be determined through L1 signaling and/or higher layer signaling from the BS or may have a predetermined value (e.g., 14 symbols). If a predefined value N (e.g., 1) is given through L1 signaling and/or higher layer signaling from the BS, T may be N symbol(s)/N subslot(s)/N slot(s). Whether a subslot or slot is used may be determined according to a HARQ-ACK codebook used for an associated SPS configuration and the length of a PUCCH slot used in a PUCCH configuration (e.g., PUCCH-config) used for the HARQ-ACK codebook. Alternatively, if there is a PUCCH configuration associated with the value of N, T may be determined according to the length of a PUCCH slot defined in the PUCCH configuration.

T may be determined through L1 signaling and/or higher layer (e.g., RRC) signaling from the BS or may have a predetermined value (e.g., 14 symbols). If a predefined value N (e.g., 1) is given through L1 signaling and/or higher layer signaling from the BS, T may be N*P symbols, where P may correspond to a configured period of an SPS PDSCH associated with a delayed PUCCH.

T may be determined through L1 signaling and/or higher layer (e.g., RRC) signaling from the BS or may have a predetermined value (e.g., 14 symbols). If a predefined value N (e.g., 1) is given through L1 signaling and/or higher layer signaling from the BS, T may be a time interval from the originally indicated starting symbol of a delayed PUCCH to the starting symbol of a PUCCH occasion only for SPS PDSCH HARQ-ACK, which is an N-th PUCCH occasion generated from the initially indicated ending symbol of the delayed PUCCH, among PUCCH occasions only for SPS PDSCH HARQ-ACK. In this case, the PUCCH occasion only for SPS PDSCH HARQ-ACK may be determined in consideration of only an SPS configuration associated with the delayed PUCCH or all PUCCH occasions only for SPS PDSCH HARQ-ACK, which are configured or configured and activated for the UE.

In Implementation B1-1, the L1 signaling from the BS for determining T may be activation DCI associated with an SPS PDSCH to which the maximum time delay length T is applicable.

If the starting symbol of the delayed PUCCH is delayed the time T after the ending symbol of an associated PDSCH or after the starting or ending symbol of the originally indicated PUCCH, the BS may expect that the UE will drop HARQ-ACK transmission without performing the corresponding PUCCH transmission (or by cancelling the PUCCH transmission).

Alternatively, the BS may assume that the UE will determine UL symbol(s)/subslot(s)/slot(s) available to delay the PUCCH. Alternatively, the BS may assume that when selecting one of candidate K1 values, the UE will determine UL symbol(s)/subslot(s)/slot(s) such that the starting symbol of the delayed PUCCH is not delayed after the lapse of the time T from the ending symbol of the associated PDSCH or from the starting or ending symbol of the originally indicated PUCCH. Alternatively, the BS may assume that the UE will select one of the candidate K1 values. If such UL symbol(s)/subslot(s)/slot(s) do not exist, or if there are no K1 values, the BS may assume that the UE will drop the HARQ-ACK transmission without performing the corresponding PUCCH transmission (or by cancelling the PUCCH transmission).

<Implementation B2> How to Construct Type-1 Delayed HARQ-ACK Codebook

The BS may expect that when the UE delays a indicated or configured PUCCH transmission to a later symbol/subslot/slot different from a symbol/subslot/slot, which is based on indicated or configured scheduling information, and when the delayed PUCCH transmission overlaps in time with another PUCCH transmission, the UE may multiplex HARQ-ACK information to be transmitted on overlapping PUCCHs onto a Type-1 HARQ-ACK codebook according to the following methods. The Type-1 HARQ-ACK codebook is a HARQ-ACK codebook in which the HARQ-ACK payload size does not change according to dynamic scheduling. For example, HARQ-ACK information generated by the HARQ-ACK codebook determination method defined in Section 9.1.2 of 3GPP TS 38.213 may be the Type-1 HARQ-ACK codebook.

Option 1: When a PUCCH carrying a HARQ-ACK is delayed, a UL slot or subslot to which transmission of the HARQ-ACK is delayed (i.e., slot/subslot after the delay) may be limited to a UL slot or subslot that may be indicated or configured by a value different from K1 values available to the UE (i.e., K1 values given by scheduling information regarding a corresponding PDSCH). For example, Implementation A1 or B1 may be used. Accordingly, the UE may multiplex HARQ-ACK information of the delayed PUCCH and HARQ-ACK information of another PUCCH while using a conventional HARQ-ACK codebook determination method. When a PDSCH is received in slot n-kl and a PUCCH is instructed to be transmitted in slot n in response to the PDSCH, if another PUCCH slot is no longer indicated for the same PDSCH, Option 1 method may be useful.

Option 2: HARQ-ACK information transferred over a delayed PUCCH and non-delayed HARQ-ACK information may be configured with different HARQ-ACK codebooks. In other words, the BS may attempt to receive PUCCHs from the UE on the following assumptions: a HARQ-ACK codebook supposed to be transferred on the delayed PUCCH and a HARQ-ACK codebook supposed to be transferred on a non-delayed PUCCH are configured separately, and the HARQ-ACK codebooks are concatenated and then transmitted over one PUCCH, which is determined based on the delayed PUCCH and non-delayed PUCCH. For example, the BS may attempt PUCCH reception by assuming that two HARQ-ACK codebooks each configured according to different rules are concatenated and transmitted on one PUCCH. In some implementations, for the HARQ-ACK information transmitted on the non-delayed PUCCH, the HARQ-ACK codebook may be determined in a conventional manner. In some implementations, the different HARQ-ACK codebooks may be configured according to at least one of the methods described in Implementation A4/B4.

Option 3: When the interval between a slot/subslot to which a HARQ-ACK PUCCH is delayed (i.e., slot/subslot after the delay) and a (UL) slot in which an associated PDSCH is received is capable of being represented as one of K1 values configured by the BS to the UE (to configure a codebook for use), information in the corresponding HARQ-ACK PUCCH may be expressed as part of a HARQ-ACK codebook configured for transmission of a non-delayed PUCCH as in Option 1. Other HARQ-ACK PUCCHs may be multiplexed together according to one of the methods described above in Option 2.

Option 4: The BS may perform scheduling such that a delayed HARQ-ACK PUCCH does not overlap in time with other PUCCHs. If the delayed HARQ-ACK PUCCH overlaps in time with the other PUCCHs, the BS may expect that the UE will not transmit the delayed HARQ-ACK PUCCH. Option 4 may be used to opportunistically support the delayed HARQ-ACK PUCCH while minimizing the impact of the delayed HARQ-ACK PUCCH on other transmissions.

<Implementation B2-1> How to Construct Delayed HARQ-ACK Codebook with Fallback HARQ-ACK Codebook In particular, when the UE uses a different codebook in response to a predetermined PDSCH or SPS release, Option 3 described above in Implementation B2 may be embodied as follows. For example, when the UE transmits only a HARQ-ACK response for i) an SPS PDSCH release indicated by DCI format 1_0 with a counter DAI field value of 1; ii) a PDSCH reception scheduled by DCI format 1_0 with a counter DAI field value of 1 on the PCell; or iii) SPS PDSCH reception(s), over one PUCCH, the UE may use a separate HARQ-ACK codebook (hereinafter, a fallback HARQ-ACK codebook) configured only for the above response, instead of using the normal Type-1 HARQ-ACK codebook specified in Sections 9.1.2.1 and 9.1.2.2 of 3GPP TS 38.213. If the fallback HARQ-ACK codebook is used for PUCCH x or PUCCH group X, and if delayed HARQ-ACK PUCCH Y overlaps in time with PUCCH x or PUCCH group X, the following UE and BS operations may be considered based on Option 3 described in Implementation B2.

Method 1: When the interval between a slot/subslot to which HARQ-ACK PUCCH Y is delayed and a (UL) slot in which an associated PDSCH is received is capable of being represented as one of K1 values configured by the BS to the UE (together with a PUCCH resource configuration), information in the corresponding HARQ-ACK PUCCH may be expressed as part of the normal Type-1 HARQ-ACK codebook configured for transmission of one or a plurality of non-delayed PUCCHs as in Option 1 described in Implementation A1. For other HARQ-ACK PUCCHs Y, HARQ-ACK information in PUCCH x or PUCCH group X may be configured as the fallback HARQ-ACK codebook based on the idea described above in Option 2, and HARQ-ACK information in PUCCH Y may be configured according to at least one of the methods described in Implementation A4/B4. The BS may attempt to receive the HARQ-ACK information by expecting that the UE will concatenate and transmit the two types of HARQ-ACK information configured in different ways in order to multiplex the HARQ-ACK information of PUCCH x or PUCCH group X and the HARQ-ACK information of PUCCH Y.

<Implementation B3> How to Construct Type-2 Delayed HARQ-ACK Codebook

When the UE delays a indicated or configured PUCCH transmission to a later symbol/subslot/slot different from a symbol/subslot/slot, which is based on indicated or configured scheduling information, and when the delayed PUCCH transmission overlaps in time with another PUCCH transmission, the UE may multiplex HARQ-ACK information to be transmitted on overlapping PUCCHs onto a Type-2 HARQ-ACK codebook according to the following methods. In addition, the BS may receive the PUCCHs in consideration of the above-described UE operation. The Type-2 HARQ-ACK codebook is a HARQ-ACK codebook in which the HARQ-ACK payload size varies according to dynamic scheduling information. For example, HARQ-ACK information generated by the HARQ-ACK codebook determination method defined in Section 9.1.3 of 3GPP TS 38.213 may be the Type-2 HARQ-ACK codebook.

- Option 1: HARQ-ACK information transferred over a delayed PUCCH and non-delayed HARQ-ACK information may be configured with different HARQ-ACK codebooks. In some implementations, the different HARQ-ACK codebooks may be configured according to at least one of the methods described in Implementation A4/B4. In some implementations, for the HARQ-ACK information transferred on the non-delayed PUCCH, a HARQ-ACK codebook may be determined in a conventional manner.
- Option 2: When a delayed PUCCH is a PUCCH for transmitting a HARQ-ACK for an SPS PDSCH, the BS may attempt to receive the PUCCH from the UE on the following assumptions: a separate HARQ-ACK codebook for SPS PDSCH reception is configured for the Type-2 HARQ-ACK codebook; and delayed SPS PDSCH reception and non-delayed (i.e., normal) SPS HARQ-ACK reception are multiplexed onto one codebook as follows.
- Option 2-1: The BS may attempt to receive HARQ-ACK information by assuming that the UE configures a HARQ-ACK codebook by connecting HARQ-ACK bits associated with SPS PDSCHs in the following order: SPS configuration index→DL slot index→PDSCH starting symbol. For example, the BS may assume that the UE will configure the HARQ-ACK codebook as follows: all HARQ-ACK bits respectively associated with SPS PDSCH occasions are arranged in order of SPS configuration indices; when multiple PDSCHs are associated with one SPS configuration index, the HARQ-ACK bits are arranged in order of the indices of DL slots in which the PDSCHs are received; and when a plurality of PDSCHs are received in one DL slot, the HARQ-ACK bits are arranged in order of the starting symbols of each PDSCH occasion.
- Option 2-2: The BS may attempt to receive HARQ-ACK information by assuming that the UE configures a HARQ-ACK codebook by connecting HARQ-ACK bits associated with SPS PDSCHs in the following order: SPS configuration index→DL slot index→{normal, delayed}. For example, the BS may assume that the UE will configure the HARQ-ACK codebook as follows: all HARQ-ACK bits respectively associated with SPS PDSCH occasions are arranged in order of SPS configuration indices; when multiple PDSCHs are associated with one SPS configuration index, the HARQ-ACK bits are arranged in order of the indices of DL slots in which the PDSCHs are received; and when a plurality of PDSCHs are received in one DL slot, the HARQ-ACK bits are arranged in order of the starting symbols of PDSCHs associated with normal HARQ-ACKs and then arranged in order of the starting symbols of PDSCHs associated with delayed HARQ-ACKs.
- Option 2-3: The BS may attempt to receive HARQ-ACK information by assuming that the UE configures a HARQ-ACK codebook by concatenating HARQ-ACK bits associated with SPS PDSCHs in the following order: SPS configuration index→{DL slot index for normal HARQ-ACK, DL slot index for delayed HARQ-ACK}. For example, the BS may assume that the UE will configure the HARQ-ACK codebook as follows: all HARQ-ACK bits respectively associated with SPS PDSCH occasions are arranged in order of SPS configuration indices; and when multiple PDSCHs are associated with one SPS configuration index, the HARQ-ACK bits are first arranged in order of the indices of DL slots in which PDSCHs associated with normal HARQ-ACKs are received and then arranged in order of the indices of DL slots in which PDSCHs associated with delayed HARQ-ACKs are received. As another example, the BS may assume that the UE will place the HARQ-ACK bits in the HARQ-ACK codebook as follows: when a plurality of SPS PDSCHs associated with one SPS configuration are capable of being received in one DL slot, that is, when there are a plurality of SPS PDSCH occasions associated with one SPS configuration in one DL slot, if PDSCH occasions in a specific DL slot are considered with reference to the indices of DL slots in which PDSCHs associated with normal HARQ-ACKs are received, the UE will place the HARQ-ACK bits in the HARQ-ACK codebook in order of the starting symbols of each PDSCH by considering only the PDSCHs associated with the normal HARQ-ACKs within the corresponding slot; and if the PDSCH occasions in the specific DL slot are considered with reference to the indices of DL slots in which PDSCHs associated with delayed HARQ-ACKs are received, the UE will place the HARQ-ACK bits in the HARQ-ACK codebook in order of the starting symbols of each PDSCH by considering only the PDSCHs associated with the delayed HARQ-ACKs.
- Option 2-4: The BS may attempt to receive HARQ-ACK information by assuming that the UE will configure one codebook by concatenating a HARQ-ACK codebook, which is configured by connecting HARQ-ACK bits associated with SPS PDSCHs in the following order: SPS configuration index→DL slot index for normal HARQ-ACK, and a HARQ-ACK codebook, which is configured by connecting the HARQ-ACK bits associated with the SPS PDSCHs in the following order: SPS configuration index→DL slot index for delayed HARQ-ACK. For example, when HARQ-ACK bits respectively associated with SPS PDSCHs may include normal HARQ-ACK bits and delayed HARQ-ACK bits, the UE may configure a HARQ-ACK codebook as follows: the normal HARQ-ACK bits are collected in order of SPS configuration indices; and when multiple normal HARQ-ACK bits are associated with one SPS configuration index, the normal HARQ-ACK bits are collected in order of the indices of DL slots in which the associated PDSCHs are received. In addition, the UE may configure another HARQ-ACK codebook as follows: the delayed HARQ-ACK bits are collected in order of SPS configuration indices; and when multiple delayed HARQ-ACK bits are associated with one SPS configuration index, the delayed HARQ-ACK bits are collected in order of the indices of DL slots in which the associated PDSCHs are received. Then, the UE may configure one HARQ-ACK codebook by concatenating the two HARQ-ACK codebooks. As another example, the BS may assume that when the UE is capable of receiving a plurality of SPS PDSCHs associated with one SPS configuration in one DL slot, the UE will place HARQ-ACK bits in a HARQ-ACK codebook in order of the starting symbols of each PDSCH by considering only PDSCHs associated with normal HARQ-ACKs within the corresponding slot if PDSCH occasions in a specific DL slot are considered with reference to the indices of DL slots in which the PDSCHs associated with the normal HARQ-ACKs are received, and the UE will place HARQ-ACK bits in a HARQ-ACK codebook in order of the starting symbols of each PDSCH by considering only PDSCHs associated with delayed HARQ-ACKs if PDSCH occasions in a specific DL slot are considered with reference to the indices of DL slots in which the PDSCHs associated with the delayed HARQ-ACKs are received.

<Implementation B4> Separate HARQ-ACK Codebook for Delayed HARQ-ACK Codebook

The BS may assume that the UE may configure a separate HARQ-ACK codebook only based on HARQ-ACK information transferred over a delayed PUCCH in order to multiplex HARQ-ACK information transferred over the delayed PUCCH and non-delayed HARQ-ACK information. In this case, the following methods may be used.

Method 1: To configure a HARQ-ACK codebook for HARQ-ACK information transferred on a delayed PUCCH, a separate K1 set available for transmission of the delayed PUCCH may be configured. The BS may assume that the delayed HARQ-ACK codebook is configured based on the separately configured K1 set in the same way when a HARQ-ACK codebook for non-delayed HARQ-ACK information is configured.

Method 2: Considering that a PUCCH is delayed to a next available PUCCH, symbol(s), subslot, and/or slot, the BS may assume that the UE will derive a set of slots/subslots in which PUCCH transmission may be cancelled and then configure a codebook for the cancelled PUCCH based on the set of slots/subslots in order to configure a separate HARQ-ACK codebook for delayed PUCCHs. For example, the BS may assume that the UE may consider a subslot or slot having PUCCH resources overlapping with DL symbols among configured PUCCH resources. That is, the BS may assume that among M*N PUCCHs, which are obtained by combining M configured PUCCH resource sets and N PUCCH resources configured for each PUCCH resource set, the UE derives a set of PUCCHs overlapping with DL symbols in a corresponding UL slot or subslot, and the UE also derives the set of PUCCHs for each UL slot. The BS may assume that for each UL slot where the corresponding PUCCH transmission may be delayed to another slot or subslot, the UE configures a HARQ-ACK codebook by concatenating UCIs to be transmitted on delayed PUCCHs in order of the PUCCH resource sets, and for one PUCCH resource set, the UE configures a HARQ-ACK codebook by concatenating the UCIs to be transmitted on the delayed PUCCHs in order of PUCCH resource IDs. The BS may assume that HARQ-ACK codebooks configured for each UL slot are concatenated in order of UL slots.

Method 3: The BS may assume that when the UE delays a PUCCH for SPS PDSCHs, the UE will configure a HARQ-ACK codebook in the same way when only SPS HARQ-ACKs are transmitted. In this case, the HARQ-ACK codebook for the delayed PUCCH may be configured according to the method(s) described in Implementation A3.

Method 4: The BS may assume that when the UE delays a PUCCH for SPS PDSCHs, the UE will configure a HARQ-ACK codebook only for SPS PDSCHs for which HARQ-ACK transmission is delayed. In this case, the BS may assume that the UE will configure the HARQ-ACK codebook for the delayed PUCCH according to the following methods, which are part of the methods described in Implementation A4. For example, the BS may assume that for HARQ-ACK bits respectively associated with SPS PDSCH occasions, the UE will configure one HARQ-ACK codebook by collecting HARQ-ACK bit(s) for PDSCH(s) associated with delayed HARQ-ACK(s) received in each DL slot as follows: in order of SPS configuration indices; and in order of the indices of DL slots in which PDSCHs associated with delayed HARQ-ACKs are received when multiple PDSCHs are associated with one SPS configuration index.

Method 5: The BS may assume that when a PUCCH (e.g., PUCCH for SPS HARQ-ACK, PUCCH for periodic CSI, PUCCH for SR, etc.) whose transmission is semi-statically configured is delayed, the UE considers only a slot in which the configured PUCCH is canceled in order to configure a HARQ-ACK codebook for the delayed PUCCH. For example, the BS may assume that the UE considers PUCCH occasions in a subslot or slot having transmissions canceled due to overlapping with DL symbols among configured PUCCH transmissions. That is, the BS may assume that the UE arranges PUCCH transmissions canceled due to overlapping with the semi-statically configured DL symbols among the configured PUCCH transmissions as follows: in order of slots; and in order of SPS configuration indices, PUCCH resource IDs, and/or starting symbols for each slot (if present), and then the UE configures a separate HARQ-ACK codebook by collecting (i.e., connecting) HARQ-ACK information related to each PUCCH occasion in the above order.

<Implementation B5> Timeline Between Delayed HARQ-ACK PUCCH and Other PUCCH Transmissions The BS may attempt to receive HARQ-ACK information from the UE by assuming that when the UE is incapable of using an indicated or configured HARQ-ACK PUCCH resource for transmission due to an indication through L1 signaling from the BS and/or a configuration through higher layer signaling from the BS, the UE delays transmission of a corresponding PUCCH. If UL multiplexing is required because delayed PUCCH transmission X overlaps in time with group Y of PUCCHs and/or PUSCHs, it may be necessary to check the timeline of overlapping UL channels again due to the delayed PUCCH. For example, the following two cases may occur.

Case 1: A case in which the last symbol of any PDSCH/PDCCH associated with delayed PUCCH transmission X (e.g., causing corresponding UL transmission) is later than the last symbol of any PDSCH/PDCCH associated with group Y of PUCCHs and/or PUSCHs (e.g., causing corresponding UL transmission).

Case 2: A case in which the starting symbol of delayed PUCCH transmission X is earlier than the earliest starting symbol of group Y of PUCCHs and/or PUSCHs.

When the above two cases occur, if UL multiplexing is performed on delayed PUCCH transmission X and group Y of PUCCHs and PUSCHs, the multiplexing timeline requirement specified in Section 9.2.5 of 3GPP TS 38.213 may not be satisfied. If the multiplexing timeline requirement is not satisfied due to the delayed PUCCH transmission, the BS may perform PUCCH reception according to at least one of the following methods.

Method 1: The BS may assume that the UE multiplexes only group Y of PUCCHs and/or PUSCHs to transmit it, without transmitting the delayed PUCCH (i.e., dropping transmission of UCI that was supposed to be carried by the delayed PUCCH). This is to minimize the effect of the delayed PUCCH transmission on other previously indicated/configured UL transmissions. Method 1 may be limited to the case where delayed PUCCH transmission X and group Y of PUCCHs and PUSCHs have the same priority index.

Method 2: The BS may assume that the UE may transmit only the delayed PUCCH without transmitting group Y of PUCCHs and/or PUSCHs. This is to prioritize the delayed PUCCH transmission over other transmissions by allowing the delayed PUCCH only for a PDSCH over which the BS transmits important traffic. Method 2 may be limited to the case where delayed PUCCH transmission X has a higher priority index than group Y of PUCCHs and/or PUSCHs.

Method 3: The BS may assume that the UE delays delayed PUCCH transmission X once more. In this case, the method(s) described in Implementation A1/B1 may be used. When the method(s) described in Implementation A1/B1 are used, the method(s) may be applied on the assumption that the time interval between PDSCH and PUCCH transmissions and the value of K1, which vary due to the delayed PUCCH, are the same as initially indicated values.

Method 4: The BS may assume that the UE delays group Y of PUCCHs and/or PUSCHs. In this case, the method(s) described in Implementation A1/B1 may be used. Method 4 may be limited to UL transmission in which group Y of PUCCHs and/or PUSCHs are semi-statically configured to be transmitted.

Method 5: The BS may assume that the UE does not transmit both the delayed PUCCH and group Y of PUCCHs and/or PUSCHs and drops UCI associated therewith. Method 5 may be used to alleviate the implementation complexity of the UE.

<Implementation B6> Avoiding Out-of-Order Due to Delayed HARQ-ACK

When the UE delays PUCCH transmission, the UE may need to consider processes for decoding other PDSCHs. To maintain the implementation complexity of the UE below a prescribed level, the UE may configure a pipeline of reception procedures by performing each process necessary for PDSCH reception sequentially for each PDSCH. In this case, an operation for the UE to always transmit a HARQ-ACK for a PDSCH received first before a HARQ-ACK for a PDSCH received later or an operation for the UE not to receive other PDSCHs before PUCCH transmission for the same HARQ process needs to be considered.

As one example, the UE is not expected to receive another PDSCH for a given HARQ process until after the end of the expected transmission of HARQ-ACK for the HARQ process. The transmission timing of a HARQ-ACK PUCCH for a PDSCH based on a prescribed HARQ process is given by Section 9.2.3 of 3GPP TS 38.213.

As another example, in a given scheduled cell, the UE is not expected to perform a first PDSCH reception and a second PDSCH reception, starting later than the first PDSCH reception, with its corresponding HARQ-ACK transmission assigned to be performed on a resource ending before the start of a different resource assigned for a HARQ-ACK transmission for the first PDSCH reception, where the two resources are in different slots for the associated HARQ-ACK transmissions, each slot composed of $N^{slot}_{symb}$ symbols or symbols indicated by subslotLengthForPUCCH-r16 if provided, and the HARQ-ACKs for the two PDSCHs are associated with a HARQ-ACK codebook of the same priority.

As another example, in a given scheduled cell, if HARQ-ACK transmissions for a first PDSCH reception and a second PDSCH reception are associated with HARQ-ACK codebooks of different priorities, the UE is not expected to perform the first PDSCH reception and the second PDSCH reception, starting later than the first PDSCH reception, with its corresponding HARQ-ACK transmission assigned to be performed on a resource ending before the start of a different resource assigned for the HARQ-ACK transmission for the first PDSCH reception.

As a further example, for any two HARQ process IDs in a scheduled cell, if the UE is scheduled to start receiving a first PDSCH (for a first HARQ process ID) starting in symbol j by a PDCCH ending in symbol i, the UE is not expected to be scheduled to receive a PDSCH (for a second HARQ process ID) starting earlier than the end of the first PDSCH with a PDCCH that ends later than symbol i.

If the UE delays a PUCCH for a first PDSCH received first, during the delaying PUCCH transmission, the starting and ending symbols of the corresponding PUCCH may vary. In this case, the starting symbol of the delayed PUCCH may be delayed after the ending symbol of a HARQ-ACK PUCCH for a second PDSCH received later than an associated PDSCH, or the ending symbol of the delayed PUCCH may be delayed after the starting symbol of another SPS PDSCH occasion associated with the same HARQ process. According to the UE operation(s) described above, part of PDSCH allocation may not be received, which may act as an additional burden and scheduling restriction to the BS.

To solve this problem, the following UE operations may be additionally considered for a delayed PUCCH in consideration of a series of UE operation(s) described above.

Method 1: The BS may assume that when the UE delays PUCCH transmission A to transmit in a UL symbol/subslot/slot later than a previously indicated or configured UL symbol/subslot/slot, if the starting symbol of the delayed PUCCH is delayed after the ending symbol of a HARQ-ACK PUCCH for another PDSCH received later than an associated PDSCH, or if the ending symbol of the delayed PUCCH is delayed after the starting symbol of another SPS PDSCH occasion associated with the same HARQ process, the UE drops HARQ-ACK transmission without performing (cancelling) the corresponding PUCCH transmission. That is, the starting symbol of the delayed PUCCH is delayed after the ending symbol of the HARQ-ACK PUCCH for the other PDSCH received later than the associated PDSCH, or if the ending symbol of the delayed PUCCH is delayed after the starting symbol of another SPS PDSCH occasion associated with the same HARQ process, the BS may receive the HARQ-ACK PUCCH for the other PDSCH received later. Alternatively, the BS may perform SPS PDSCH transmission on the other SPS PDSCH occasion and cancel reception of the delayed HARQ-ACK. Alternatively, to achieve the same effect, when the UE delays PUCCH transmission, the BS may assume that the ending symbol of a HARQ-ACK PUCCH for another PDSCH transmitted later by the UE to the UE and the starting symbol of another SPS PDSCH occasion associated with the same HARQ process are the maximum delay time points of the starting and ending symbol of the delayed PUCCH. In some implementations, the operation may be limited to the case where another PDSCH received later than a PDSCH associated with PUCCH transmission A is dynamically indicated. In some implementations for Method 1, the starting or ending symbol of the delayed PUCCH may be the starting or ending symbol of a PUCCH (i.e., MUX PUCCH) that considers other PUCCHs scheduled to be transmitted in a corresponding UL symbol/subslot/slot. Alternatively, considering the possibility of DCI missing, the starting or ending symbol of the delayed PUCCH may be the starting or ending symbol of a PUCCH (i.e., PUCCH before consideration of multiplexing) that does not consider other PUCCHs scheduled to be transmitted in a corresponding UL symbol/subslot/slot (i.e., PUCCH before multiplexing is considered).

Method 2: The BS may assume that when the UE delays PUCCH transmission, if the starting symbol of the delayed PUCCH is capable of being delayed after the ending symbol of a HARQ-ACK PUCCH for another PDSCH received later than a corresponding PDSCH, the UE delays or multiplexes the HARQ-ACK PUCCH for the other PDSCH received later. Compared to Method 1, Method 2 may increase the implementation complexity of the UE but may transmit HARQ-ACK information to the BS as much as possible.

Method 2-1: The BS may assume that the UE delays PUCCH transmission A to the first PUCCH in time, among HARQ-ACK PUCCH(s) for other PDSCH(s) received later than a PDSCH associated with the delayed PUCCH.
  Method 2-2: The BS may assume that the UE multiplexes UCI (e.g., HARQ-ACK bits) transferred on PUCCH transmission A with the first PUCCH in time, among HARQ-ACK PUCCH(s) for other PDSCH(s) received later than a PDSCH associated with the delayed PUCCH.
  Method 2-3: The BS may assume that the UE delays a HARQ-ACK PUCCH for another PDSCH received later than a PDSCH associated with the delayed PUCCH. In this case, the HARQ-ACK PUCCH for the other PDSCH may be delayed to a resource of the delayed PUCCH. For example, when PDSCH #2 and PDSCH #3 are transmitted later than PDSCH #1 associated with delayed PUCCH #1, HARQ-ACK PUCCH #2 for PDSCH #2 and HARQ-ACK PUCCH #3 for PDSCH #3 may be delayed to a resource of delayed PUCCH #1, which is transmitted later than HARQ-ACK PUCCH #2 and HARQ-ACK PUCCH #3.
  Method 2-4: The BS may assume that the UE multiplexes UCI (e.g., HARQ-ACK bits) transmitted on a HARQ-ACK PUCCH for another PDSCH received later than a PDSCH associated with a delayed PUCCH with PUCCH transmission A.

<Implementation B7> How to Combine Delayed SPS HARQ-ACK Codebooks and Other Codebooks The BS may assume that when the UE uses Implementations A1/A2/A3/A4 of the present disclosure in combination, the UE may configure a single UCI by combining one or more delayed SPS HARQ-ACK codebooks and HARQ-ACK transmission scheduled in slots for delay as follows.

The BS may assume that when the UE delays and transmits a codebook including SPS HARQ-ACK(s), delayed HARQ-ACK information is limited to HARQ-ACKs for SPS PDSCH receptions. In this case, each of the delayed HARQ-ACK codebooks may be configured as a separate HARQ-ACK codebook including only HARQ-ACK response(s) for SPS PDSCH receptions(s) as described in Implementation A2-1. For example, each delayed HARQ-ACK codebook may be configured according to the method specified in Section 9.1.2 of 3GPP TS 38.213, which is described above in Implementation A7.

The BS may assume that when the UE delays and transmits PUCCH a or group A of PUCCHs including a HARQ-ACK for an SPS PDSCH (hereinafter referred to as an SPS HARQ-ACK) to and in slot T, the UE configures a single HARQ-ACK UCI by concatenating delayed HARQ-ACK codebooks in the chronological order of initial slots before the delay in order to configure a HARQ-ACK codebook based only on HARQ-ACK information transferred on delayed PUCCHs, as described in Implementation A4. Then, the BS may attempt to receive the HARQ-ACK UCI from the UE. For example, the BS may assume that when the UE delays and transmits N PUCCHs to and in slots $T_1$, $T_2$, ..., $T_{N-1}$ (where if $n<m$, $T_n<T_m$), respectively, the UE configures HARQ-ACK UCI of $\{H_1, H_2, ..., H_{N-1}\}$ by concatenating N HARQ-ACK codebooks of $H_1, H_2, ..., H_{N-1}$ consisting of SPS HARQ-ACKs scheduled in slots in order of the slots or configures HARQ-ACK UCI of $\{H_{N-1}, H_{N-2}, ..., H_1\}$ by concatenating the N HARQ-ACK codebooks in reverse order of the slots.

The BS may assume that if non-delayed HARQ-ACK information is scheduled in slot T, the UE configures a single HARQ-ACK UCI by appending UCIs configured with delayed HARQ-ACK codebooks to the non-delayed HARQ-ACK information.

When delayed HARQ-ACK codebooks are concatenated in order of slots, a first delayed HARQ-ACK codebook may be included in preceding bits of the final HARQ-ACK UCI, compared to HARQ-ACK codebooks delayed to later UL slots. Thus, the UE may first decode the first delayed HARQ-ACK codebook. When the delayed HARQ-ACK codebooks are concatenated in reverse order of the slots, if the HARQ-ACK codebooks are appended to non-delayed SPS HARQ-ACKs in slots for delay, the HARQ-ACK codebooks may be arranged in the final HARQ-ACK UCI in the reverse order of UL slots. Thus, it may be easy to configure the HARQ-ACK codebooks at once based on one pseudo-code.

The UE and BS may perform RRC configurations required to perform PDSCH reception and PUCCH transmission associated therewith. When the UE is incapable of performing PDSCH reception indicated by the BS or PUCCH transmission for an activated SPS PDSCH based on a slot format indicated/configured to the UE, the UE may delay HARQ-ACK transmission to another symbol/subslot/ slot/PUCCH according to some implementations of the present disclosure described above. In some implementations of the present disclosure, if the delayed HARQ-ACK transmission overlaps with another PUCCH, the UE may perform UL multiplexing thereon, and the BS may receive the PUCCH multiplexed with the delayed HARQ-ACK transmission from the UE. In some implementations of the present disclosure, if a PUCCH for the delayed HARQ-ACK transmission overlaps in time with another PDSCH occasion using the same HARQ-ACK process as a HARQ-ACK process used by a PDSCH associated with the delayed HARQ-ACK transmission, the UE may drop the delayed HARQ-ACK transmission and perform PDSCH reception on the other PDSCH occasion.

According to some implementations of the present disclosure, when the UE delays PUCCH transmission according to a predetermined rule or in a random way, the UE may piggyback the delayed PUCCH transmission and UCI on different delayed or non-delayed PUCCH transmission and UCI. If necessary, the UE may perform UL multiplexing thereon, and the BS may obtain the location of a delayed PUCCH resource and receive the multiplexed UL transmission. The UE may configure a separate HARQ-ACK codebook for delayed HARQ-ACK transmission through a series of processes in order to maintain the conventional UE implementation and also perform UL multiplexing for the delayed HARQ-ACK. Thus, the BS may schedule a PUSCH and PUCCH without scheduling constraints caused by the delayed HARQ-ACK.

The UE may perform operations according to some implementations of the present disclosure in association with reception of DL channel(s). The UE may include at least one transceiver; at least one processor; and at least one computer memory operably connectable to the at least one processor and storing instructions that, when executed, cause the at least one processor to perform operations according to some implementations of the present disclosure. A processing apparatus for the UE may include at least one processor; and at least one computer memory operably connectable to the at least one processor and storing instructions that, when executed, cause the at least one processor to perform operations according to some implementations of the present disclosure. A computer readable storage medium may store at least one computer program including instructions that, when executed by at least one processor, cause the at least one processor to perform operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure.

For the UE, processing device, computer-readable (non-volatile) storage medium, and/or computer program product, the operations may include: determining to delay transmission of first HARQ-ACK information for a first SPS PDSCH to a second resource later than a first resource scheduled to perform the transmission of the first HARQ-ACK information; and based on that an end of a PUCCH for transmission of the delayed first HARQ-ACK information is later in time than a start of a second SPS PDSCH based on a same HARQ process as the first SPS PDSCH, dropping the transmission of the delayed first HARQ-ACK information.

In some implementations, the operations may include receiving the second SPS PDSCH.

In some implementations, the operations may include: determining to delay transmission of third HARQ-ACK information for a third SPS PDSCH to the second resource later than a third resource scheduled to perform the transmission of the third HARQ-ACK information; and generating HARQ-ACK UCI including the first HARQ-ACK information and the third HARQ-ACK information. The first HARQ-ACK information and the third HARQ-ACK information may be included in the HARQ-ACK UCI in chronological order of the first resource and the third resource.

In some implementations, generating the HARQ-ACK UCI may include appending the first HARQ-ACK information and the third HARQ-ACK information to HARQ-ACK information scheduled to be performed on the second resource.

In some implementations, the first HARQ-ACK information and the third HARQ-ACK information may be included in the HARQ-ACK UCI in chronological order of the first resource and the third resource.

In some implementations, the first HARQ-ACK information and the third HARQ-ACK information may be included in the HARQ-ACK UCI in reverse chronological order of the first resource and the third resource.

The BS may perform operations according to some implementations of the present disclosure in relation to transmission of DL channel(s). The BS may include: at least one transceiver; at least one processor; and at least one computer memory operably connected to the at least one processor and configured to store instructions that, when executed, cause the at least one processor to perform the operations according to some implementations of the present disclosure. A processing device for a BS may include: at least one processor; and at least one computer memory operably connected to the at least one processor and configured to store instructions that, when executed, cause the at least one processor to perform the operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure.

For the BS, processing device, computer-readable (non-volatile) storage medium, and/or computer program product, the operations may include: determining to delay reception of first HARQ-ACK information for a first SPS PDSCH to a second resource later than a first resource on which the reception of the first HARQ-ACK information is scheduled to be performed; and based on an end of a PUCCH for reception of the delayed first HARQ-ACK information being later in time than a start of a second SPS PDSCH that uses a same HARQ process as the first SPS PDSCH, omitting the reception of the delayed first HARQ-ACK information.

In some implementations, the operations may include transmitting the second SPS PDSCH.

In some implementations, the operations may include: determining to delay reception of third HARQ-ACK information for a third SPS PDSCH to the second resource later than a third resource on which the reception of the third HARQ-ACK information is scheduled to be performed; and receiving HARQ-ACK UCI that includes the first HARQ-ACK information and the third HARQ-ACK information. The first HARQ-ACK information and the third HARQ-ACK information may be included in the HARQ-ACK UCI in chronological order of the first resource and the third resource.

In some implementations, the first HARQ-ACK information and the third HARQ-ACK information may be appended to HARQ-ACK information scheduled to be performed on the second resource so that the first HARQ-ACK information and the third HARQ-ACK information may be included in the HARQ-ACK UCI.

In some implementations, the first HARQ-ACK information and the third HARQ-ACK information may be included in the HARQ-ACK UCI in chronological order of the first resource and the third resource.

In some implementations, the first HARQ-ACK information and the third HARQ-ACK information may be included in the HARQ-ACK UCI in reverse chronological order of the first resource and the third resource.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

What is claimed is:

1. A method of transmitting control information by a user equipment (UE) in a wireless communication system, the method comprising:
   determining, in a first slot, a first physical uplink control channel (PUCCH) for a transmission of first hybrid automatic repeat request-acknowledgement (HARQ-ACK) information bits for semi-persistent scheduling (SPS) physical downlink shared channel (PDSCH) receptions;
   based on the first PUCCH overlapping with a symbol indicated as downlink, determining a second slot and a second PUCCH in the second slot to multiplex HARQ-ACK information bits that include second HARQ-ACK information bits from the first HARQ-ACK information bits; and
   transmitting the second PUCCH in the second slot,
   wherein, based on the UE receiving a PDSCH providing a transport block (TB) for a same HARQ process as a HARQ-ACK information bit from the second HARQ-ACK information bits prior to transmitting the second PUCCH, the UE does not include the HARQ-ACK information bit in the HARQ-ACK information bits.

2. The method of claim 1, comprising:
   generating a HARQ-ACK codebook scheduled to be transmitted in the second slot,
   generating the HARQ-ACK information bits that includes i) the second HARQ-ACK information bits from the first HARQ-ACK information bits and ii) the HARQ-ACK codebook.

3. The method of claim 2, wherein generating the HARQ-ACK information bits comprises:
   appending, to the HARQ-ACK codebook, the second HARQ-ACK information bits from the first HARQ-ACK information bits.

4. The method of claim 2, wherein the HARQ-ACK codebook includes no HARQ-ACK information bit which is deferred to the second slot from a slot prior to the second slot.

5. The method of claim 1, wherein the second HARQ-ACK information bits from the first HARQ-ACK information bits are included in the HARQ-ACK information bits, in an order of related SPS configuration index, and, for each SPS configuration index, in an order of downlink (DL) slot index of DL slot for a related SPS PDSCH reception.

6. A user equipment (UE) configured to transmit control information in a wireless communication system, the UE comprising:
   at least one transceiver;
   at least one processor; and
   at least one computer memory operably connected to the at least one processor and configured to store instructions that, when executed, cause the at least one processor to perform operations comprising:
   determining, in a first slot, a first physical uplink control channel (PUCCH) for a transmission of first hybrid automatic repeat request-acknowledgement (HARQ-ACK) information bits for semi-persistent scheduling (SPS) physical downlink shared channel (PDSCH) receptions;
   based on the first PUCCH overlapping with a symbol indicated as downlink, determining a second slot and a second PUCCH in the second slot to multiplex HARQ-ACK information bits that include second HARQ-ACK information bits from the first HARQ-ACK information bits; and
   transmitting the second PUCCH in the second slot,
   wherein, based on the UE receiving a PDSCH providing a transport block (TB) for a same HARQ process as a HARQ-ACK information bit from the second HARQ-ACK information bits prior to transmitting the second PUCCH, the UE does not include the HARQ-ACK information bit in the HARQ-ACK information bits.

7. The UE of claim 6, wherein the operations comprise:
   generating a HARQ-ACK codebook scheduled to be transmitted in the second slot,
   generating the HARQ-ACK information bits that includes i) the second HARQ-ACK information bits from the first HARQ-ACK information bits and ii) the HARQ-ACK codebook.

8. The UE of claim 7, wherein generating the HARQ-ACK information bits comprises:
   appending, to the HARQ-ACK codebook, the second HARQ-ACK information bits from the first HARQ-ACK information bits.

9. The UE of claim 7, wherein the HARQ-ACK codebook includes no HARQ-ACK information bit which is deferred to the second slot from a slot prior to the second slot.

10. The UE of claim 6, wherein the second HARQ-ACK information bits from the first HARQ-ACK information bits are included in the HARQ-ACK information bits, in an order of related SPS configuration index, and, for each SPS configuration index, in an order of downlink (DL) slot index of DL slot for a related SPS PDSCH reception.

11. A base station (BS) configured to receive control information from a user equipment (UE) in a wireless communication system, the BS comprising:
   at least one transceiver;
   at least one processor; and
   at least one computer memory operably connected to the at least one processor and configured to store instructions that, when executed, cause the at least one processor to perform operations comprising:
   determining, in a first slot, a first physical uplink control channel (PUCCH) for a reception of first hybrid automatic repeat request-acknowledgement (HARQ-ACK) information bits for semi-persistent scheduling (SPS) physical downlink shared channel (PDSCH) transmissions;
   based on the first PUCCH overlapping with a symbol indicated as downlink, determining a second slot and a second PUCCH to receive HARQ-ACK information bits that include second HARQ-ACK information bits from the first HARQ-ACK information bits; and
   receiving the second PUCCH in the second slot,
   wherein, based on the BS transmitting, to the UE, a PDSCH providing a transport block (TB) for a same HARQ process as a HARQ-ACK information bit from the second HARQ-ACK information bits prior to receiving the second PUCCH, the HARQ-ACK information bits do not include the HARQ-ACK information bit.

12. The BS of claim 11, wherein the HARQ-ACK information bits include i) the second HARQ-ACK information bits from the first HARQ-ACK information bits and ii) a HARQ-ACK codebook scheduled to be received in the second slot.

13. The BS of claim 12, wherein the second HARQ-ACK information bits from the first HARQ-ACK information bits are appended to the HARQ-ACK codebook to be included in the HARQ-ACK information bits.

14. The BS of claim 12, wherein the HARQ-ACK codebook includes no HARQ-ACK information bit which is deferred to the second slot from a slot prior to the second slot.

15. The BS of claim 11, wherein the second HARQ-ACK information bits from the first HARQ-ACK information bits are included in the HARQ-ACK information bits, in an order of related SPS configuration index, and, for each SPS configuration index, in an order of downlink (DL) slot index of DL slot for a related SPS PDSCH reception.

* * * * *